US012718517B2

(12) United States Patent
Rosenfeld et al.

(10) Patent No.: US 12,718,517 B2
(45) Date of Patent: Aug. 25, 2026

(54) AUTOMATED DETECTION OF CHEMICAL COMPONENT OF MOVING OBJECT

(71) Applicant: X Development LLC, Mountain View, CA (US)

(72) Inventors: Daniel Rosenfeld, Mountain View, CA (US); Alexander Holiday, Brookfield, WI (US); Gearoid Murphy, San Jose, CA (US); Allen Richard Zhao, Mountain View, CA (US); Hongxu Ma, San Jose, CA (US); Cyrus Behroozi, Menlo Park, CA (US); Derek Werdenberg, Dublin, CA (US); Jie Jacquot, San Carlos, CA (US); Vadim Tschernezki, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 649 days.

(21) Appl. No.: 17/811,766

(22) Filed: Jul. 11, 2022

(65) Prior Publication Data

US 2023/0023641 A1 Jan. 26, 2023

Related U.S. Application Data

(63) Continuation-in-part of application No. 17/383,293, filed on Jul. 22, 2021, now Pat. No. 11,995,842.

(51) Int. Cl.
*G06V 10/58* (2022.01)
*B07C 5/342* (2006.01)
(Continued)

(52) U.S. Cl.
CPC .............. *G06V 10/58* (2022.01); *B07C 5/342* (2013.01); *G01N 21/84* (2013.01); *G06V 10/143* (2022.01);
(Continued)

(58) Field of Classification Search
CPC .... G06V 10/58; G06V 10/143; G06V 10/147; G06V 10/26; G06V 10/60; G06V 10/764;
(Continued)

(56) References Cited

U.S. PATENT DOCUMENTS 5,040,229 A 8/1991 Lee et al.
5,835,633 A 11/1998 Fujisaki et al.
(Continued)

FOREIGN PATENT DOCUMENTS

AU 2014292179 A1 12/2015
CN 102289673 A 12/2011
(Continued)

OTHER PUBLICATIONS

Melit Devassy, B., & George, S. (2021). Forensic analysis of beverage stains using hyperspectral imaging. Scientific reports, 11(1), 6512. (Year: 2021).*
(Continued)

*Primary Examiner* — Bobbak Safaipour
*Assistant Examiner* — Ashley Hytrek
(74) *Attorney, Agent, or Firm* — Mughal Gaudry & Franklin PC

(57) ABSTRACT

Image data is obtained that indicates an extent to which one or more objects reflect, scatter, or absorb light at each of multiple wavelength bands, where the image data was collected while a conveyor belt was moving the object(s). The image data is preprocessed by performing an analysis across frequencies and/or performing an analysis across a representation of a spatial dimension. A set of feature values is generated using the image preprocessed image data. A machine-learning model generates an output using to the feature values. A prediction of an identity of a chemical in the one or more objects or a level of one or more chemicals in the object(s) is generated using the output. Data is output
(Continued)

indicating the prediction of the identity of the chemical in the object(s) or the level of the one or more chemicals in at least one of the one or more objects.

20 Claims, 11 Drawing Sheets

(51) Int. Cl.
*G01N 21/84* (2006.01)
*G06V 10/143* (2022.01)
*G06V 10/147* (2022.01)
*G06V 10/26* (2022.01)
*G06V 10/60* (2022.01)
*G06V 10/764* (2022.01)
*G06V 10/82* (2022.01)
*H04N 23/11* (2023.01)

(52) U.S. Cl.
CPC ............ *G06V 10/147* (2022.01); *G06V 10/26* (2022.01); *G06V 10/60* (2022.01); *G06V 10/764* (2022.01); *G06V 10/82* (2022.01); *H04N 23/11* (2023.01); *B07C 2501/0054* (2013.01); *G01N 2021/845* (2013.01)

(58) Field of Classification Search
CPC .................... G06V 10/82; B07C 5/342; B07C 2501/0054; G01N 21/84; G01N 2021/845; H04N 23/11
See application file for complete search history.

(56) References Cited

U.S. PATENT DOCUMENTS 7,840,071 B2 11/2010 Tang et al.
8,164,673 B2 4/2012 Horie
8,284,991 B2 10/2012 Tojo et al.
8,406,469 B2 3/2013 Fisher
8,860,942 B1 10/2014 Ewing et al.
9,107,624 B2 8/2015 Darty
9,251,431 B2 2/2016 Doepke et al.
9,268,110 B2 2/2016 Bueler et al.
9,945,721 B2 4/2018 Abolbashari et al.
10,013,760 B2 7/2018 Bhargava
10,452,924 B2 10/2019 Adato et al.
10,453,197 B1 10/2019 Cholakkal et al.
10,515,715 B1 12/2019 Pappas et al.
10,520,482 B2 12/2019 McPeek
10,810,723 B2 10/2020 Onoro-Rubio et al.
10,902,581 B2 1/2021 Nipe et al.
11,410,295 B2 * 8/2022 Nipe .................... G06T 7/0008
11,443,417 B2 * 9/2022 Nipe .................... G06V 10/82
2008/0118106 A1 5/2008 Kilambi et al.
2014/0122044 A1 5/2014 Yasukawa
2015/0021478 A1 1/2015 Lee et al.
2016/0358027 A1 12/2016 Hotta et al.
2017/0147905 A1 5/2017 Huang et al.
2017/0316285 A1 11/2017 Ahmed et al.
2018/0284273 A1 10/2018 Buettgen et al.
2018/0349770 A1 12/2018 Nelson et al.
2019/0026586 A1 1/2019 Liu et al.
2019/0065880 A1 2/2019 Loginov et al.
2019/0139193 A1 5/2019 Navarrete Michelini et al.
2019/0180153 A1 6/2019 Buckler et al.
2019/0205643 A1 7/2019 Liu et al.
2022/0355342 A1 11/2022 Kumar et al.

FOREIGN PATENT DOCUMENTS

CN 103942562 A 7/2014
CN 104050677 A 9/2014
CN 104077613 A 10/2014
CN 104732240 A 6/2015
CN 105528589 A 4/2016
CN 108921822 A 11/2018
CN 110084311 A 8/2019
CN 108052984 B 11/2019
CN 110647793 A 1/2020
CN 112906750 A 6/2021
EP 1670597 B1 6/2006
EP 2208974 A1 7/2010
EP 2942615 A1 11/2015
EP 3567518 A1 11/2019
JP 6679188 A 4/2020
JP 6679188 B 4/2020
JP 6679188 B1 * 4/2020
WO 0169191 A1 9/2001
WO 2007098123 A2 8/2007
WO 2015007697 A1 1/2015
WO 2016095117 A1 6/2016
WO 2017130249 A1 8/2017
WO 2017223206 A1 12/2017
WO 2018141429 A1 8/2018
WO 2018187632 A1 10/2018
WO 2019084854 A1 5/2019
WO 2019178561 A2 9/2019
WO 2021089602 A1 5/2021

OTHER PUBLICATIONS

Bonifazi, G., & Serranti, S. (Mar. 2014). Quality control by HyperSpectral Imaging (HSI) in solid waste recycling: logics, algorithms and procedures. In Image Processing: Machine Vision Applications VII (vol. 9024, pp. 189-203). SPIE. (Year: 2014).*
Zheng, Y., Bai, J., Xu, J., Li, X., & Zhang, Y. (2018). A discrimination model in waste plastics sorting using NIR hyperspectral imaging system. Waste Management, 72, 87-98. (Year: 2018).*
Devassy, B. M., & George, S. (2019). Ink classification using convolutional neural network. Nisk J, 12, 1-16. (Year: 2019).*
Melit Devassy, B., & George, S. (2020). Contactless classification of strawberry using hyperspectral imaging. CEUR Workshop Proceedings. (Year: 2020).*
HySpex Rotation Stages. (Aug. 15, 2020). Wayback Machine. https://web.archive.org/web/20200815054638/https://www.hyspex.com/hyspex-products/accessories/tripods-and-stages/rotation-stages/#expand (Year: 2020).*
Notice of Allowance for U.S. Appl. No. 17/383,293, dated Feb. 6, 2024.
"Plastics sorting with Specim FX hyperspectral cameras", Dec. 18, 2020, available online at https://www.specim.com/ plastics-sorting-with-specim-fx-cameras/ (Year: 2020).
Liu et al., "Application of Multispectral Imaging to Determine Quality Attributes and Ripeness Stage in Strawberry Fruit", Plos One, vol. 9, No. 2, Feb. 4, 2014, pp. 1-8 (Year: 2014).
Office Action for U.S. Appl. No. 17/383,293, dated Oct. 18, 2023.
"Brix", Available Online at: https://en.wikipedia.org/wiki/Brix, Accessed from Internet on Sep. 23, 2021, 4 pages.
"Chemical Agent Detection", Available Online at: flir.in/threat-detection/chemical/, Aug. 2021, 3 pages.
"Chemometrics", Available Online at: https://en.wikipedia.org/wiki/Chemometrics, Accessed from Internet on Sep. 23, 2021, 7 pages.
"Counting Objects with Faster R-CNN", Available online at https://softwarermill.com/counting-obiects-with-faster-rcnn/, Jun. 2, 2017, 21 pages.
"MobileNetV2: The Next Generation of On-Device Computer Vision Networks", Google AI Blog, Available Online at: http://ai.googleblog.com/2018/04/mobilenetv2-next-generation-of-on.html, Apr. 3, 2018, 3 pages.
"Mobilenet V2", Pytorch, Available Online at: https://pytorch.org/hub/pytorch_vision_mobilenet_v2/, Jul. 22, 2019, 2 pages.
"Objects Counting by Estimating a Density Map with Convolution Neural Networks", Available online at https://towardsdatascience.com/objects-counting-by-estimating-a-density-map-wiith-convolutional-neural-networks-c01086f3b3ec, Sep. 27, 2019, pp. 1-15.
"Optical Gas Imaging for the Chemical Industry", Flir.com, Available Online at: https://www.flir.in/discover/instruments/gas-detection/optical-gas-imaging-for-the-chemical-industry/, Aug. 2021, 5 pages.

(56) References Cited

OTHER PUBLICATIONS

"Optical Sorting", Available Online at: https://en.wikipedia.org/wiki/Optical_sorting, Accessed from Internet on Sep. 23, 2021, 7 pages.
"R-CNN, Fast R-CNN, Faster R-Cnn, Yolo . . . Object Detection Algorithms", Available online at https://towardsdatascience.com/r-cnn-fast-r-cnn-faster-r-cnn-yolo-object-detection-algorithms-36d53571365e, Jul. 10, 2018, 11 pages.
"Resnet101", MathWorks, Available Online at: https://www.mathworks.com/help/deeplearning/ref/resnet101.html;jsessionid=1a374f68ed8d150528c1ba657502, Oct. 24, 2018, 3 pages.
"Tensorflow Count Objects in Image", Available online at: https://stackoverflow.com/questions/42375680/tensorflowcount-objects-in-image, Feb. 21, 2017, 2 pages.
"The Ins and Outs of Using Post-Consumer Resin in Packaging", Canadian Plastics, Available Online at: https://www.canplastics.com/features/the-ins-and-outs-of-using-post-consumer-resin-in-packaging/, May 6, 2021, 4 pages.
Akai et al., "Distortion-Adaptive Grape Bunch Counting for Omnidirectional Images", Available Online at: https://arxiv.org/pdf/2008.12511.pdf, Aug. 28, 2020, 8 pages.
Alam et al., "CRF Learning with CNN Features for Hyperspectral Image Segmentation", IEEE International Geoscience and Remote Sensing Symposium (IGARSS), Jul. 10-15, 2016, 5 pages.
Annibale et al., "Optical Measurement of Focal Offset in Tunable Lenses", Optics Express, vol. 24, No. 2, Jan. 25, 2016, pp. 1031-1036.
Barbin et al., "Near-Infrared Hyperspectral Imaging for Grading and Classification of Pork", Meat Science, vol. 90, No. 1, Jan. 2012, pp. 259-268.
Bargoti et al., "Deep Fruit Detection in Orchards", IEEE International Conference on Robotics and Automation (ICRA), May 29-Jun. 3, 2017, pp. 3626-3633.
Baweja et al., "StalkNet: A Deep Learning Pipeline for High-Throughput Measurement of Plant Stalk Count and Stalk Width", Field and Service Robotics, Nov. 2017, pp. 271-284.
Brownlee , "How to Configure Image Data Augmentation in Keras", Machine Learning Mastering, Available Online at: https://machinelearningmastery.com/how-to-configure-image-data-augmentation-when-training-deep-learning-neural-networks/, Apr. 12, 2019, 58 pages.
Chen et al., "Predicting the Anthocyanin Content of Wine Grapes by NIR Hyperspectral Imaging", Food Chemistry, vol. 172, Apr. 1, 2015, pp. 788-793.
Cohen et al., "Count-ception: Counting by Fully Convolutional Redundant Counting", Proceedings of the IEEE International Conference on Computer Vision, 2017, pp. 18-26.
Culurciello , "Segmenting, Localizing and Counting Object Instances in an Image", Available Online at: https://towardsdatascience.com/segmenting-localizing-and-counting-object-instances-in-an-image-878805fef7fc, Oct. 26, 2017, pp. 1-8.
Cu-Nguyen et al., "An Imaging Spectrometer Employing Tunable Hyperchromatic Microlenses", Light: Science & Applications, vol. 5, No. 4, Apr. 8, 2016, 9 pages.
Cu-Nguyen et al., "Tunable Hyperchromatic Lens System for Confocal Hyperspectral Sensing", Optics Express, vol. 21, No. 23, Nov. 18, 2013, pp. 27611-27621.
Dahab et al., "Automated Brain Tumor Detection and Identification Using Image Processing and Probabilistic Neural Network Techniques", International Journal of Image Processing and Visual Communication, vol. 1, No. 2, Oct. 2012, 5 pages.
Elmasry et al., "Chemical-Free Assessment and Mapping of Major Constituents in Beef Using Hyperspectral Imaging", Journal of food Engineering, vol. 117, No. 2, Jul. 2013, pp. 235-246.
Gao et al., "Counting Dense Objects in Remote Sensing Images", CoRR, Available Online at: https://arxiv.org/pdf/2002.05928.pdf, Feb. 14, 2020, 5 pages.
Gao et al., "Intra-Ensemble in Neural Networks", CoRR, Available Online at: https://arxiv.org/pdf/1904.04466v1.pdf, Apr. 9, 2019, 11 pages.
Gao et al., "PSGCNet: A Pyramidal Scale and Global Context Guided Network for Dense Object Counting in Remote Sensing Images", arXiv:2012.03597, Dec. 7, 2020, 12 pages.
Gat , "Imaging Spectroscopy Using Tunable Filters: A Review", Proceedings of SPIE—The International Society for Optical Engineering, vol. 4056, No. 1, Apr. 2000, pp. 50-64.
Godi et al., "SIMCO: SIMilarity-Based Object Counting", CoRR, Available Online at: https://arxiv.org/pdf/1904.07092.pdf, Oct. 13, 2020, 6 pages.
Goel et al., "Low-Power Object Counting with Hierarchical Neural Networks", CoRR, Available Online at: https://arxiv.org/pdf/2007.01369.pdf, Jul. 2, 2020, 6 pages.
Gomez-Sanchis et al., "Hyperspectral System for Early Detection of Rottenness Caused by Penicillium Digitatum in Mandarins", Journal of food Engineering, vol. 89, No. 1, Apr. 2008, pp. 80-86.
Gomez-Sanchis et al., "Segmentation of Hyperspectral Images for the Detection of Rotten Mandarins", International Conference Image Analysis and Recognition, Jun. 2008, 2 pages.
Guan et al., "Understanding the Ability of Deep Neural Networks to Count Connected Components in Images", CoRR, Available Online at: https://arxiv.org/pdf/2101.01386.pdf, Jan. 5, 2021, 7 pages.
Gupta et al., "Hyperspectral Imaging Using Acoustic-Optic Tunable Filters", Part of the SPIE Conference on Automatic Target Recognition IX, vol. 3718, Apr. 1999, pp. 512-521.
Habermann et al., "Supervised Band Selection in Hyperspectral Images Using Single-Layer Neural Networks", International Journal of Remote Sensing, vol. 40, No. 10, Dec. 2018, pp. 1-27.
Habermann et al., "Unsupervised Hyperspectral Band Selection Using Clustering and Single-layer Neural Network", Revue Francaise de Photogrammetrie et de Teledetection, Sep. 2018, 10 pages.
Halstead et al., "Fruit Quantity and Quality Estimation using a Robotic Vision System", arXiv:1801.05560, Jan. 2018, 8 pages.
Hani et al., "Apple Counting using Convolutional Neural Networks", IEEE/RSJ International Conference on Intelligent Robots and Systems (IROS), Oct. 2018, 7 pages.
Hu et al., "Deep Convolutional Neural Networks for Hyperspectral Image Classification", Journal of Sensors, vol. 2015, Jul. 30, 2015, 13 pages.
Islam et al., "Detection of Potato Diseases Using Image Segmentation and Multiclass Support Vector Machine", IEEE 30th Canadian Conference on Electrical and Computer Engineering (CCECE), Apr. 2017, pp. 30-33.
Iwai et al., "Speeded-Up Focus Control of Electrically Tmrnble Lens by Sparse Optimization", Scientific Reports, vol. 9, No. 12365, Aug. 26, 2019, pp. 1-6.
Kahveci , "How to Count Objects on the Image with Deep Learning Algorithms?", Available Online at: https://www.researchgate.net/post/How-to-count-objects-on-the-image-with-deep-learning-algorithms, Apr. 30, 2020, 8 pages.
Kamruzzaman et al., "Non-Destructive Prediction and Visualization of Chemical Composition in Lamb Meat Using NIR Hyperspectral Imaging and Multivariate Regression", Innovative Food Science & Emerging Technologies, vol. 16, Oct. 2012, pp. 218-226.
Kasmani et al., "A-CCNN: Adaptive CCNN for Density Estimation and Crowd Counting", CoRR, Available Online at: https://arxiv.org/pdf/1804.06958.pdf, Apr. 20, 2018, 5 pages.
Kemker et al., "Algorithms for Semantic Segmentation of Multispectral Remote Sensing Imagery Using Deep Learning", ISPRS Journal of Photogrammetry and Remote Sensing, Available Online at: https://arxiv.org/pdf/1703.06452.pdf, May 2018, 45 pages.
Koirala et al., "Deep Learning for Real-Time Fruit Detection and Orchard Fruit Load Estimation: Benchmarking of 'Mango YOLO", Precision Agriculture, vol. 20, Feb. 28, 2019, pp. 1107-1135.
Lempitsky et al., "Learning To Count Objects in Images", Advances in Neural Information Processing Systems, vol. 23, Dec. 2010, pp. 1-9.
Liu et al., "Robust Fruit Counting: Combining Deep Learning, Tracking, and Structure from Motion", IEEE/RSJ International Conference on Intelligent Robots and Systems, Aug. 2018, 8 pages.
Lorenzo et al., "Segmentation of Hyperspectral Images Using Quantized Convolutional Neural Networks", 21st Euromicro Conference on Digital System Design (DSD), Aug. 29-31, 2018, pp. 260-267.

(56) References Cited

OTHER PUBLICATIONS

Marsden et al., "People, Penguins and Petri Dishes: Adapting Object Counting Models To New Visual Domains and Object Types without Forgetting", CoRR, Nov. 2017, pp. 8070-8079.
Mcgregor et al., "Adaptive Hyperspectral Imager: Design, Modeling, and Control", Journal of Optics, vol. 17, No. 8, Aug. 2015, 11 pages.
Mikami et al., "DeepCounter: Using Deep Leaning to Count Garbage Bags", IEEE 24th International Conference on Embedded and Real-Time Computing Systems and Applications (RTCSA), Jan. 9, 2019, 10 pages.
Millan et al., "Dynamic Compensation of Chromatic Aberration in a Programmable Diffractive Lens", Optics Express, vol. 14, No. 20, Oct. 2006, pp. 9103-9112.
Nesteruk et al., "Image Augmentation for Multitask Few-Shot Leaning: Agricultural Domain Use-Case", Available Online at: https://arxiv.org/pdf/2102.12295.pdf, Feb. 2021, 12 pages.
Noroozi et al., "Representation Learning by Learning to Count", Proceedings of the IEEE International Conference on Computer Vision, 2017, pp. 5898-5906.
Rahnemoonfar et al., "Deep Count: Fruit Counting Based on Deep Simulated Learning", Sensors, vol. 17, No. 4, Apr. 2017, 12 pages.
Sam et al., "Switching Convolutional Neural Network for Crowd Counting", 2017 IEEE Conference on Computer Vision and Pattern Recognition, Jul. 2017, 9 pages.
Santos De Arruda et al., "Counting and Locating High-Density Objects Using Convolutional Neural Network", CoRR, Available Online at https://arxiv.org/pdf/2102.04366.pdf, Feb. 8, 2021, 15 pages.
Segui et al., "Learning to Count with Deep Object Features", Proceedings of the IEEE Conference on Computer Vision and Pattern Recognition, May 2015, pp. 90-96.
Shang et al., "End-to-End Crowd Counting via Joint Learning Local and Global Count", 2016 IEEE International Conference on Image Processing, Sep. 2016, pp. 1215-1219.
Sharma , "It's a Record-Breaking Crowd! A Must-Read Tutorial to Build your First Crowd Counting Model using Deep Learning", Analytics Vidhya, Available Online at: https://www.analyticsvidhya.com/blog/2019/02/building-crowd-counting-modelpython/, Feb. 18, 2019, 11 pages.
Shen et al., "Liquid Crystal Integrated Metalens with Tunable Chromatic Aberration", Advanced Photonics, vol. 2, No. 3, May-Jun. 2020, pp. 1-7.
Sokhandan et al., "A Few-Shot Sequential Approach for Object Counting", CoRR, Available Online at: https://arxiv.org/pdf/2007.01899v2.pdf, Jul. 2020, 19 pages.
Stein et al., "Image Based Mango Fruit Detection, Localization and Yield Estimation Using Multiple View Geometry", Sensors, vol. 16, No. 11, Nov. 2016, pp. 1-25.
Suzuki et al., "Estimation of Chemical Composition of Grass in Meadows using Hyperspectral Imaging", Environmental Control in Biology, vol. 46, No. 2, Jan. 2008, pp. 129-137.
Takahashi et al., "A Novel Weight-Shared Multi-Stage CNN for Scale Robustness", IEEE Transactions on Circuits and Systems for Video Technology, vol. 14, No. 8, Available Online at: https://arxiv.org/pdf/1702.03505.pdf, Aug. 2015, pp. 1-13.
Tan et al., "Cells Counting with Convolutional Neural Network", Intelligent Computing Methodologies, Jul. 2018, pp. 102-111.
Trajanovsk et al., "Tumor Semantic Segmentation in Hyperspectral Images Using Deep Learning", International Conference on Medical Imaging with Deep Learning—Extended Abstract Track, Apr. 2019, 4 pages.
Walach et al., "Learning to Count with CNN Boosting", Computer Vision, Sep. 2016, 17 pages.
Wang et al., "Correcting Axial Chromatic Aberration in a Fixed Focal Plane, Near-Infrared Imaging System", CSBE/SCGAB Annual Conference, Jul. 16-19, 2006, 14 pages.
Xu et al., "Dilated-Scale-Aware Attention ConvNet for Multi-Class Object Counting", CoRR, Available online at https://arxiv.org/pdf/2012.08149.pdf, Dec. 2020, 7 pages.
Yang et al., "Reverse Perspective Network for Perspective-Aware Object Counting", Proceedings of the IEEE/CVF Conference on Computer Vision and Pattern Recognition, Jun. 2020, pp. 4374-4383.
Zhan et al., "A New Hyperspectral Band Selection Approach based on Convolutional Neural Network", IEEE International Geoscience mid Remote Sensing Symposium, Jul. 23-28, 2017, pp. 3660-3663.
Zhang et al., "Cross-Scene Crowd Counting via Deep Convolutional Neural Networks", Proceedings of the IEEE Conference on Computer Vision and Pattern Recognition, Jun. 2015, pp. 833-841.
Zhao et al., "Chromatic Aberrations Correction for Imaging Spectrometer Based on Acousto-Optic Tunable Filter with Two Transducers", Optics Express, vol. 25, No. 20, Oct. 2, 2017, pp. 23809-23825.
Zhao et al., "Spectral-Spatial Feature Extraction for Hyperspectral Image Classification: A Dimension Reduction and Deep Learning Approach", IEEE Transactions on Geoscience and Remote Sensing, vol. 54, No. 8, Aug. 2016, pp. 4544-4554.
Zhao et al., "Using Deep Learning in Image Hyper Spectral Segmentation, Classification, and Detection", Fourth Seminar on Novel Optoelectronic Detection Technology and Application, vol. 10697, Feb. 20, 2018, 6 pages.
Devassy et al., "Contactless Classification of Strawberry Using Hyperspectral Imaging", Available Online at: URL:http://ceur-ws.org/Vol-2688/paper9.pdf, Jan. 1, 2020, 12 pages.
Liu et al., "Application of Multispectral Imaging to Determine Quality Attributes and Ripeness Stage in Strawberry Fruit", Plos One, vol. 9, No. 2, Feb. 4, 2014, pp. 1-8.
International Application No. PCT/US2022/036826, "Invitation to Pay Additional Fees and, Where Applicable, Protest Fee", Oct. 10, 2022, 4 pages.
International Application No. PCT/US2022/036828, "Invitation To Pay Additional Fees And, Where Applicable, Protest Fee", Oct. 18, 2022, 8 pages.
International Application No. PCT/US2022/036826, International Search Report and Written Opinion, Mailed On Dec. 2, 2022, 12 pages.
International Application No. PCT/US2022/036828, International Search Report and the Written Opinion, Mailed On Dec. 9, 2022, 12 pages.
Office Action for Japanese Patent Application No. 2023-578905, dated Feb. 6, 2025.
Office Action for European Patent Application No. 22751549.1, dated Aug. 29, 2025.
Office Action for Japanese Patent Application No. 2023-578905, dated Aug. 21, 2025.

* cited by examiner

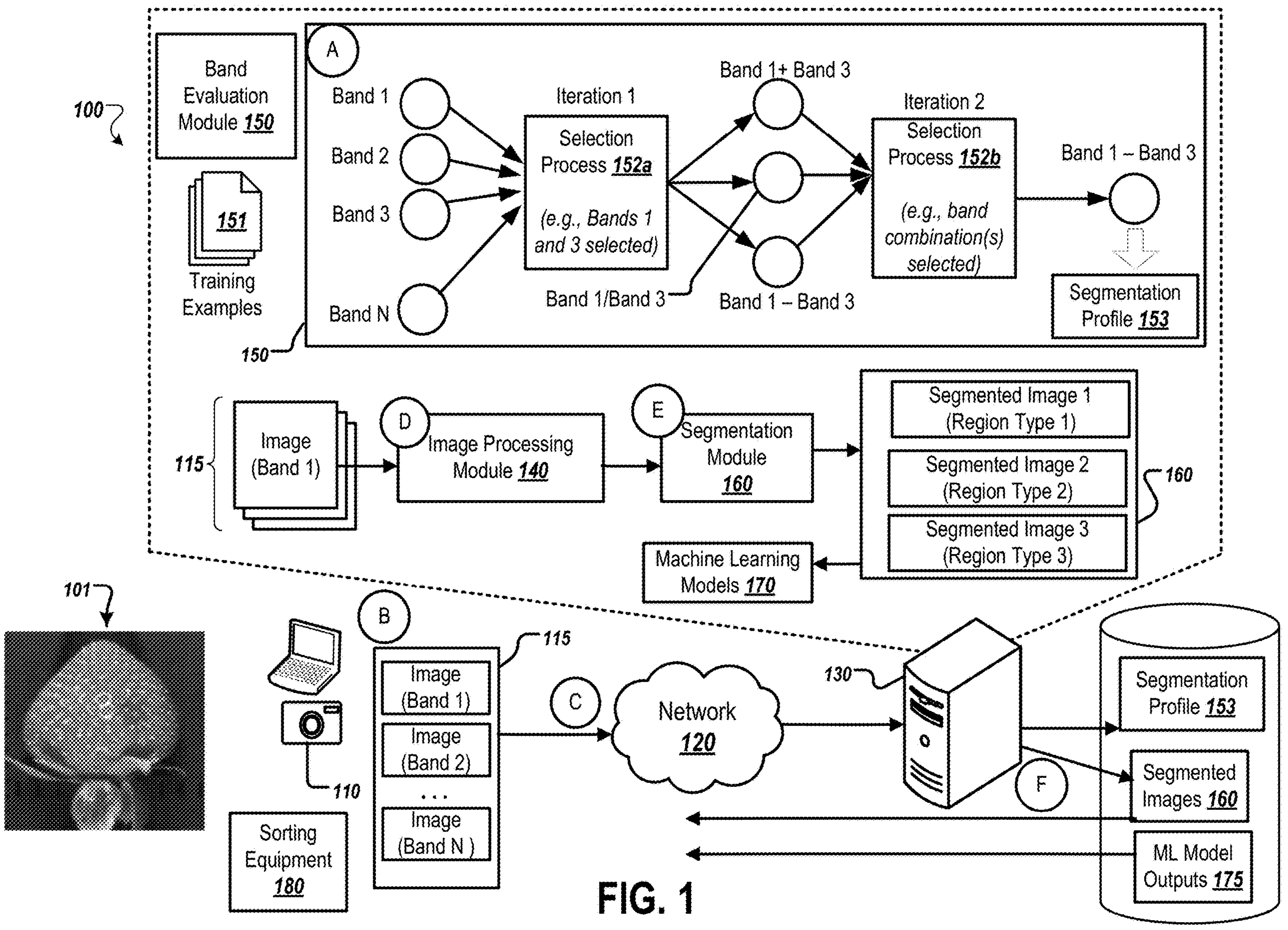
100
Band Evaluation Module 150
151
Training Examples
150
A
Band 1
Band 2
Band 3
Band N
Iteration 1
Selection Process 152a
(e.g., Bands 1 and 3 selected)
Band 1/Band 3
Band 1+ Band 3
Band 1 – Band 3
Iteration 2
Selection Process 152b
(e.g., band combination(s) selected)
Band 1 – Band 3
Segmentation Profile 153
115
Image (Band 1)
D
Image Processing Module 140
E
Segmentation Module 160
Segmented Image 1 (Region Type 1)
Segmented Image 2 (Region Type 2)
Segmented Image 3 (Region Type 3)
160
Machine Learning Models 170
101
B
115
Image (Band 1)
Image (Band 2)
...
Image (Band N )
110
Sorting Equipment 180
C
Network 120
130
F
Segmentation Profile 153
Segmented Images 160
ML Model Outputs 175
FIG. 1

AUTOMATED DETECTION OF CHEMICAL COMPONENT OF MOVING OBJECT

CROSS-REFERENCE TO RELATED APPLICATION

This application is a continuation-in-part of U.S. application Ser. No. 17/383,293, filed on Jul. 22, 2021, which is hereby incorporated by reference in its entirety for all purposes.

TECHNICAL FIELD

This specification generally relates to collecting and automatically analyzing hyperspectral images of moving objects. More specifically, hyperspectral images of moving objects are collected; features are extracted; and a machine-learning model is used to predict each of one or more components of a depicted object using the features.

BACKGROUND

Computer vision can be used to automatically process images to (for example) predict what is depicted in the images. Various circumstances can introduce complications to this automated processing. For example, in some instances, one object (or animal, plant, etc.) is in front of and partly obscures another object (or animal, plant, etc.). As another example, a perspective issue may arise such that a depiction of an object has a shape, texture, color, etc. that is different than one typically characteristic of the object. As yet another example, lighting of an environment, or brightness of a light source as seen by a camera may be different on a given day relative to another day (or may be different relative to another environment or camera), which may complicate efforts to use intensities and/or frequency data from a captured image to accurately characterize what is being depicted.

Image segmentation is a technique of digital image processing that partitions an image into meaningful portions so that pixels belonging to a particular portion share similar features. This allows analysis of a digital image by defining shapes and boundaries of objects within an image. Image segmentation has been used widely in multiple domains such as autonomous vehicles, medical image diagnostics, and satellite imaging. Image segmentation, however, may be less possible and/or less accurate when real-world complications of image processing (e.g., such as those noted above) arise.

It would be advantageous if image-processing systems and techniques were improved so as to be able to more reliably and accurately detect what is being depicted in an image and characteristics of the depicted elements.

SUMMARY

According to one innovative aspect of the subject matter described in this specification, a computer system can use hyperspectral images to perform image segmentation with greater accuracy and efficiency than previous approaches. Hyperspectral images—which provide image data about a subject for multiple bands of light that differ in wavelength (e.g., “wavelength bands,” “spectral bands,” or simply “bands”)— include significantly more information than traditional color or greyscale images. This information comes in many forms, often including more bands than the typical RGB images, including information about narrower spectral bands than traditional RGB Bayer filter bands, and also including information for bands outside the visible range (e.g., infrared, ultraviolet, etc.).

Not all of the wavelength bands of hyperspectral images are relevant to each type of boundary to be segmented, however. As a result, depending on the type of object imaged and its properties (e.g., material, composition, structure, texture, etc.), image data for different hyperspectral wavelength bands may be indicative of region boundaries. Similarly, for some object types and region types, information for some wavelength bands may add noise or actually obscure the desired boundaries, so that reducing segmentation accuracy and increasing the computational cost of segmentation analysis.

Further, real-world imaging introduces complications, such as those described above, which can result in erroneous detections and/or characterizations. Some of these complications may be selectively pronounced or more pronounced in some wavelength bands relative to other wavelength bands.

The techniques described below explain how a computer system can generate and use profiles that specify the different combinations of wavelength bands that provide accurate and efficient detection and/or segmentation of different object types and region types and/or that provide accurate and efficient characterization of depicted objects. Using these profiles, the system can selectively use the image data in images (e.g., hyperspectral and/or visible-light images) so that different combinations of the image bands are used for locating different types of regions or types of boundaries in the images. For example, for a particular object type, a profile may indicate that for objects of that object type, a first type of region should be segmented using image data for bands 1, 2, and 3, while a second type of region should be segmented using image data for bands 3, 4, and 5. When processing images of the particular object type, the segmentation parameters specified in the profile are used, including the subset of bands for each region type, e.g., image data for bands 1, 2, and 3 to identify regions of the first type and image data for bands 3, 4, and 5 to identify regions of the second type.

The hyperspectral images may have been generated using an optical system that includes one or more light sources and one or more cameras (and/or one or more light sensors). The light source(s) may be configured to emit (for example) infrared light, near-infrared light, shortwave light, coherent light, etc. In some instances, the light source(s) include fiberoptics, which can (for example) separate the thermal output of the light source from its spectral output. In some instances, at least one of the camera(s) is positioned such that an optical axis of a lens or image sensor of the camera is between 75-105 degrees, 80-90 degrees, 85-95 degrees, or 87.5-92.5 degrees, 30-60 degrees, 35-55 degrees, 40-50 degrees, 42.5-47.5 degrees, or less than 15 degrees relative to a surface supporting the object(s) being imaged (e.g., a conveyor belt). In some instances, the optical system includes multiple cameras, where an angle between an optical axis of a first camera relative to a surface supporting the object(s) is different than an angle between an optical axis of a second camera relative to the surface. The difference may be (for example) at least 5 degrees, at least 10 degrees, at least 15 degrees, at least 20 degrees, at least 30 degrees, less than 30 degrees, less than 20 degrees, less than 15 degrees, and/or less than 10 degrees. In some instances, a first camera filters for a different type of light relative to a second camera. For example, a first camera may be an infrared camera, and a second camera may be a visible-light camera.

As an exemplary implementation, the segmentation of images of fruit can be used to automatically assess the characteristics and quality of fruit by a computer vision system. Beyond simply segmenting fruit from the background, the system can be used to segment different parts of the fruit from each other. For a strawberry, the exterior includes leaves (e.g., calyx, sepals, peduncle), seeds (e.g., achenes), and the flesh (e.g., receptacle). The flesh can have regions of different conditions, e.g., ripe, unripe, bruised, moldy, decaying, etc. To facilitate the rapid and efficient machine vision analysis of individual strawberries for quality control or other purposes, the system can generate a profile for the strawberry object type that specifies types of regions of interest (e.g., leaves, seeds, and flesh) and the subsets of bands of a hyperspectral image to be used for segmenting or identifying regions of each region type. These subsets of bands can be determined through data-driven analysis of training examples, which include hyperspectral images and ground truth segmentations indicating the region types for the examples. The profile may specify other parameters for each region type, such as functions to apply to the image data of different bands, thresholds to use, and so on. With the profile defined, the system can process a hyperspectral image of a strawberry accurately and efficiently segment each region type. For each region type, the system can define boundaries for instances of that region type using the subset of bands and other parameters specified in the profile. As a result, each region type can be accurately segmented using the subset of bands that best indicates the region boundaries and processing is more efficient by limiting the number of bands used for segmentation of each region type.

As another exemplary implementation, the segmentation of images of waste materials can be used to better identify and characterize recyclable materials. As an example, the system can be used to accurately segment regions of image data representing different types of plastics (e.g., polyethylene (PE), polyethylene terephthalate (PET), polyvinyl chloride (PVC), polypropylene (PP), etc.) to automatically detect the material of an object and to identify where objects of different types are located. In addition, the segmentation techniques can be used to identify and characterize additives in materials as well as instances of contamination. For example, in addition to or instead of identifying regions involving one or more primary materials (e.g., PE vs. PET), the segmentation techniques can also identify objects or portions of objects where different additives are present (e.g., phthalates, bromides, chlorates, UV-resistant coatings,) or where contaminants are present (e.g., oils, food residue, etc.). To better characterize regions of different types, the system can generate and store profiles for different types of objects and materials that specify types of regions of interest (e.g., different types of materials, different additives present, different contaminants) and the subsets of bands of a hyperspectral image to be used for segmenting or identifying regions of each region type. These subsets of bands can be determined through data-driven analysis of training examples, which can include hyperspectral images and ground truth segmentations indicating the region types for the examples. The profile may specify other parameters for each region type, such as functions to apply to the image data of different bands, thresholds to use, and so on. With the profiles defined, the system can process a hyperspectral image and accurately and efficiently segment each region type. For each region type, the system can define boundaries for regions composed of different materials, regions where different contaminants are detected, regions where different types of contamination are present, and so on. As a result, each region type can be accurately segmented using the subset of bands that best indicates the region boundaries and processing is more efficient by limiting the number of bands used for segmentation of each region type.

As discussed further below, the system can also define synthetic bands that modify a band before carrying out segmentation. A synthetic band can be based on one or more image bands in a hyperspectral image, but may have one or more functions or transformations applied. For example, a synthetic band may be a composite or aggregate of two or more bands, with a function applied to the bands (e.g., addition, subtraction, multiplication, division, etc.). One example is to calculate, as a synthetic band, a normalized index based on two bands, such as taking the difference of two bands divided by the sum of the two bands. For a hyperspectral image where the image for each band has dimensions of 500 pixels by 500 pixels, the result of generating a normalized index for bands 1 and 2 may be a 2D image of 500 pixels by 500 pixels, where each pixel in the result is calculated by combining the two pixels, $P_{band1}$ and $P_{band2}$, at the same position in source images according to the formula $(P_{band1}-P_{band2})/(P_{band1}+P_{band2})$. Another example is to apply a function that accepts all bands across a set of pixels and maps each set of pixels to a single number. This function is then convolved along the height and width of the image to produce a new synthetic band across the entire image. A final example is to apply a function to each individual pixel that projects all bands to a single number. This function can similarly be applied to each pixel in the image to produce a new synthetic band at each point. This of course is only one way to combine image data for different bands, and many different functions can be used.

The synthetic bands, along with other parameters, can be used by the system to amplify or emphasize the types of information that are indicative of region boundaries while filtering or reducing the effect of image information that is not indicative of region boundaries. This provides an enhanced image on which segmentation algorithms can then be applied. By defining the bands and functions for each region of interest in advance, the segmentation processing can be much faster and less computationally expensive than other techniques, such as processing each hyperspectral image with a neural network. In general, the synthetic bands can combine information about a region boundary that is distributed over the image data for various different bands, allowing the system to extract the hyperspectral image components that best signal region boundaries from the various band and combine them into one or more composite images that allow for high-accuracy, high-confidence segmentation. Another advantage of the approach is that it allows an empirical, data-driven approach to customizing segmentation for different object types and region types while requiring much less training data and training computation than is typically required for training neural networks and similar models.

To generate the profiles, the system can perform a selection process to identify the subset of wavelength bands of a hyperspectral image that allows more accurate segmentation of different region types. This process can include multiple phases or iterations applied to training examples. A first phase can assess the image data for individual bands, selecting the subset of individual bands that most distinctly show differences between the regions of interest (e.g., having the highest difference or most consistently show a difference between a particular region to be segmented and one or more other region types represented in the training data). A predetermined number of bands, or the subset of bands that satisfies certain criteria, can be selected for further assessment in a second phase. The second phase can involve generation of synthetic bands based on the application of different functions to the individual selected bands from the first phase. For example, if bands 1 and 2 were selected in phase 1, the system can generate several different candidate bands based on different ways of combining those two bands (e.g., band 1 minus band 2, band 1 plus band 2, normalized index of band 1 and band 2, etc.). The system can then evaluate how distinctly and consistently the normalized bands distinguish the region of interest from other regions, and select a subset of these synthetic bands (e.g., selecting a predetermined number having the highest scores, selecting those that have a region type discrimination score above a minimum threshold, etc.). The selection process can optionally continue with further phases to assess and select from different combinations of the synthetic bands, with each additional phase selecting new combinations that provide higher accuracy and/or consistency of discrimination of the region types of interest.

In the application of optical sorting and classification of plastics, the system can significantly improve the discriminating power of the system by generating combined or synthetic bands of image data and discovering which bands to use to detect different materials. For example, the analysis can be performed to determine which bands best discriminate between different base plastic types, as well as discriminating these from other common materials. Similarly, the analysis can be used to select the bands that best discriminate a base type of plastic without additives (e.g., pure PE) from that type of plastic with one or more additives (e.g., phthalates, bromides, chlorates, etc.), as well as for discriminating between regions that are uncontaminated from regions that have different types of surface contaminants. The selection of bands may be dependent on the type of base plastic, which sets the baseline amount of reflectance and variation in certain spectral regions. Thus different combinations of bands may be selected for identifying regions of different additives or contaminants are present. In some implementations, the band selection can be informed by the set of materials to be discriminated between and the specific types of additives and contaminants of interest.

In some instances, pre-processing is performed before a portion (e.g., a segment, region, pixel group, or pixel) of an image is processed (e.g., for object identification, object characterization, component detection, etc.). The pre-processing can include identifying one or more features. Then, a subsequent processing (e.g., that predicts whether a depicted object includes any of one or more components) may be configured to process a relatively small set of features instead of many (e.g., hundreds to thousands) of intensities in one or more spectra. For example, a normalization and/or subtraction process may be performed using the spectrum and one or more other baseline spectra. As another example, a spectrum may be pre-processed by calculating a derivative (or second derivative) of the spectrum, and frequencies corresponding to crossing a baseline or zero-line in the derivative (or second derivative) can be defined as features. As yet another example, a spectrum (or a derivative or second derivative of the spectrum) may be convolved using a kernel (e.g., which may have a Gaussian shape, shape of a single sine cycle, shape that corresponds to one or more chemicals, etc.), and the convolved spectrum (itself or a characteristic thereof) may be defined as a feature. As still another example, a baseline may be removed from a spectrum. Another example includes identifying one or more features from the spectrum using a smoothing technique (e.g., local least squares or the Savtizky-Golay method). For example, the Savtizky-Golay method can fit a p-order polynomial to the n points surrounding each data point, to thereby smooth data and provide facile estimation of derivatives (given that the polynomial can then be differentiated). As another example, the local least squares technique can be used to fit any functional form to the data.

In one general aspect, a method performed by one or more computers includes: obtaining, by the one or more computers, image data of a hyperspectral image, the image data comprising image data for each of multiple wavelength bands; accessing, by the one or more computers, stored segmentation profile data for a particular object type that indicates a predetermined subset of the wavelength bands designated for segmenting different region types for images of an object of the particular object type; segmenting, by the one or more computers, the image data into multiple regions using the predetermined subset of the wavelength bands specified in the stored segmentation profile data to segment the different region types; and providing, by the one or more computers, output data indicating the multiple regions and the respective region types of the multiple regions.

In some implementations, a computer system uses a machine learning model to predict the chemical content of an object based on an image of the object. The machine learning model can be trained based on images of objects and results of conventional chemical analysis. For example, the training images can be of an object prior to a destructive testing process and the training labels or training targets can be the results of a destructive testing process, such as the amount or concentration of one or more chemicals within the object. Through training, the machine learning model can learn to predict chemical properties of objects based on properties of the appearance of the undamaged exterior of the objects, allowing prediction of chemical composition without damage to the objects.

One application of the technology is to predict the sugar content in fruits based on images of the fruits. The system can acquire hyperspectral images of fruits and provide data from the hyperspectral images to a machine learning model that has been trained to predict sugar content. Models can be trained for a particular type of fruit to achieve high accuracy. For example, one model can be specialized to predict sugar content of strawberries, another model may be trained to predict sugar content of cherries, and so on. The model may be configured to provide a regression output, such as a prediction of a numerical value indicating an amount of a chemical of interest. For example, a model may predict a value for degrees Brix or another unit representing a concentration of sugar. These techniques can provide fast, non-destructive determinations of sugar content and other chemical content of fruit or other types of samples.

Another application of the technology is to predict the chemical content of other materials, such as plastics. The technology can be used to assess the composition of waste materials to facilitate sorting and recycling of materials. The system can segment regions of a hyperspectral image corresponding to different plastic types. As an example, a facility can include a conveyor that moves material, such as plastic items (alone or mixed with other items), in view of a hyperspectral camera. The hyperspectral images captured are then segmented using different segmentation profiles for different base plastics (e.g., PE, PEG, PET, etc.). Segmentation profiles can specify different sets of spectral bands, including potentially different synthetic bands that alter or combine captured spectral band data, to use for segmenting regions of different base plastic types as well as for distinguishing regions with contaminants and plastics with additives from regions where the base plastics are present. Using the segmented image data, the system can use the segmented regions that isolate data describing a particular material (e.g., a region of base plastic, a region of plastic having a specific additive, a region where contamination is present, etc.) to generate the machine learning model input used for prediction of chemical content and concentration. For example, having segmented a hyperspectral image to identify the specific areas showing a PET based plastic with oil contamination from food residue, the system can use the spectral data for that segmented area to generate input to a machine learning model trained to characterize that contamination, e.g., predict chemical makeup of the contaminant and concentration of the contaminant. Different models can be created to predict different chemical properties or properties for different regions. For example, some models can be trained to predict the concentration of different contaminants, other models can be trained to predict the concentration of different additives, and so on. When multiple types of regions are segmented, the hyperspectral image data for each region type can be processed with a machine learning model trained for chemical analysis for that particular region type.

In some implementations, imaging data or scan data generated through other techniques besides hyperspectral imaging data can be used for segmentation and for predicting the amounts and concentrations of chemicals. For example, X-ray fluorescence and laser-induced breakdown spectroscopy can be used, in addition to or as an alternative to hyperspectral imaging. More generally, any appropriate form of spectroscopy can be used, e.g., absorption spectroscopy, emission spectroscopy, elastic scattering and reflection spectroscopy, impedance spectroscopy, Raman spectroscopy and other analysis of inelastic scattering phenomena, coherent or resonance spectroscopy, or nuclear spectroscopy. These additional analysis techniques can be used to generate data that are essentially other bands of information that the computer systems can consider. When determining which bands of information to use for segmenting different information types, and determining which bands to use for predicting different chemical properties, the computer systems can select which spectroscopic techniques and portions of the spectrographic results are most informative about the presence and amount of different chemicals. Similarly, information resulting from these spectroscopic techniques can be used to train models and to provide information as input to trained models to generate predictions.

In general, one innovative aspect of the subject matter described in this specification can be embodied in methods that include the actions of: obtaining, by the one or more computers, image data for an image that includes a representation of an object, the image data comprising image data for each of multiple wavelength bands including one or more wavelength bands outside a visible wavelength range; providing, by the one or more computers, feature data derived from the image data to a machine learning model that has been trained to predict a level of chemical content in the object in response to feature data derived from image data representing an exterior of the object; receiving, by the one or more computers, an output of the machine learning model produced in response to the feature data, the output comprising a prediction of the level of chemical content in the object represented in the image; and providing, by the one or more computers, output data indicating the predicted level of chemical content in the object.

In some implementations, the output data is displayed by the one or more computers on a display. In some implementations, the output data is provided over a communication network to a client device. The output data may be provided in response to a request from the client device that is associated with the image data.

The machine learning model can be one that has been trained to provide a value that indicates a predicted concentration or amount of an additive to plastic or a contaminant to plastic. For example, the machine learning model can be one that is trained to indicate a predicted level of additive that is present in a plastic of a particular type in response to receiving feature data derived from images of plastic of the particular type. In some implementations, the prediction is based only on the image data (and/or features of the image data), without receiving any result of other chemical analysis for the plastic, without altering the object (e.g., destructive chemical processing of the plastic), etc. In some implementations, the output is a regression output, such as a numerical value indicating a predicted concentration of a chemical. In other implementations, the output of the machine learning model can be a classification whether a chemical is present or not, or a classification corresponding to different ranges or levels of concentration. Examples of additives that can be assessed include phthalates, bromides, chlorates, and coatings. Similarly, the type and concentration of different types of contaminants such as oil, grease, and food residue can also be predicted with appropriate models. In some implementations, models can be trained to predict characteristics of the base plastic resin, such as the type of resin(s) present, the level of purity of a resin, and so on.

In some implementations, the system may be used to generate an output for a single object, such as a single plastic item. In other implementations, the system may be used to generate output that characterizes a collection of multiple items, such as a group of plastic items on a conveyor belt in a recycling facility. In some implementations, different chemical output predictions can be determined for different portions of an object, such as to show different levels of contamination at different portions of an object.

A machine learning model can be trained using training data comprising (i) example image data for plastic items and (ii) indications of chemical content for the plastic items represented in the example image data. The machine learning model can be one that has been trained using training data comprising (i) example image data for a particular type of base plastic (e.g., PE, PP, PET, etc.) and (ii) indications of levels of one or more additive(s) or contaminant(s) that were measured for the plastic items represented in the example image data. The machine learning model has been trained to remotely and non-destructively predict the chemical content of plastics represented in an image, the machine learning model having been trained based on (i) example image data providing representations of example plastic items prior to physical or chemical testing of the plastic items (which may include destructive testing) and (ii) measurement results obtained through testing of the example plastic items that are represented in the example image data.

The machine learning model can be one that has been trained to provide a value that indicates a predicted concentration or amount of sugar. For example, the machine learning model can be one that has been trained to indicate a predicted level of sugar content in fruit of the particular type in response to receiving feature data derived from images of fruit of the particular type. In some implementations, the prediction is based only on the image data, without receiving any result of other chemical analysis for the object (e.g., fruit), without altering the object (e.g., without cutting or obtaining information about the interior of the fruit), etc.

The output of the machine learning model comprises an indication of a predicted level of sugar content in the whole fruit (e.g., not cut or segmented) of the particular type and the output data indicates the level of sugar content in the whole fruit of the particular type. The model can be generated and trained for a specific type of fruit, and potentially also for predicting a concentration or amount of a particular chemical or set of chemicals. Different models can use different features, such as features for different sets of spectral bands, to predict properties of different types of objects or to predict different chemical properties, such as concentrations or amounts of different chemicals.

The machine learning model can be one that has been trained to indicate a predicted level of sugar content in fruit juice of fruit in response to receiving feature data derived from image data for an image of an exterior of the fruit. The machine learning model can be configured to indicate the predicted level of sugar content in fruit juice as a value of at least one of degrees Brix, degrees Plato, specific gravity of sugar, mass fraction of sugar, or concentration of sugar. In other implementations, the model can predict a classification that indicates a level or range of an amount of a chemical for a sample.

In some implementations, the particular fruit that is assessed is a particular strawberry, e.g., a specific single strawberry. The machine learning model has been trained to indicate a predicted level of sugar content in fruit juice from strawberries in response to receiving feature data derived from image data for an image of an exterior of the strawberries. The output of the machine learning model comprises an indication of a predicted level of sugar content of fruit juice from the particular strawberry and the output data indicates the predicted level of sugar content of fruit juice from the particular strawberry.

A machine learning model can be trained using training data comprising (i) example image data for fruit and (ii) indications of sugar content for the fruit represented in the example image data. The machine learning model has been trained using training data comprising (i) example image data for strawberries and (ii) indications of levels of sugar content measured for the strawberries represented in the example image data. The machine learning model has been trained to non-destructively predict the sugar content of fruit represented in an image, the machine learning model having been trained based on (i) example image data providing representations of example fruit prior to destructive testing of the example fruit and (ii) results obtained through destructive testing of the example fruit that are represented in the example image data.

Various types of machine learning models can be used. For example, the machine learning model can be a decision tree or a neural network. In some cases, the machine learning model is a gradient boosted regression tree.

In some cases, image segmentation can be performed on the image data to identify regions of a predetermined type wherein the feature data is derived from the image data for the identified regions of the predetermined type. The feature data that is provided to the model can exclude information for regions that are not of the predetermined type. For example, image data for regions of an image that show the object to be analyzed, but which still do not meet certain predetermined criteria (e.g., represent portions of the object not desired for the analysis for a certain property) can be excluded from input to the model. Thus, the features can represent information for the regions of the predetermined type, while omitting information about regions that are not of the particular type. The regions of the predetermined type that are used for analysis can be regions showing flesh of a strawberry, and the feature data for input to the machine learning model is derived from the image data representing the flesh of the strawberry. Image data for other regions, such as regions corresponding to a calyx and achenes of the strawberry, can be excluded from analysis.

The image data used for analysis can be hyperspectral image data, in which data is obtained for one or more wavelength bands outside the visible wavelength range. For example, the image data can include data for reflectance (or absorptance or absorbance) in one or more wavelength bands for infrared light. The feature data for input to the model can also be based on the image data captured for one or more wavelength bands of infrared light.

In some embodiments, a computer-implemented method is provided that includes: obtaining image data that indicates an extent to which one or more objects reflect, scatter, or absorb light at each of multiple wavelength bands, where the image data was collected while a conveyor belt was moving the one or more objects; preprocessing the image data to generate preprocessed image data, where the preprocessing includes performing an analysis across frequencies and/or performing an analysis across a representation of a spatial dimension; generating a set of feature values derived from the preprocessed image data; generating, based on an output produced by a machine learning model in response to the set of feature values being provided as input to the machine learning model, a prediction of an identity of a chemical in the one or more objects or a level of one or more chemicals in the one or more objects; and providing data indicating the prediction of the identity of the chemical in the one or more objects or the level of the one or more chemicals in at least one of the one or more objects.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 1 is a block diagram illustrating an example of a system implemented to perform image segmentation using hyperspectral images.

DETAILED DESCRIPTION

Figure 2:
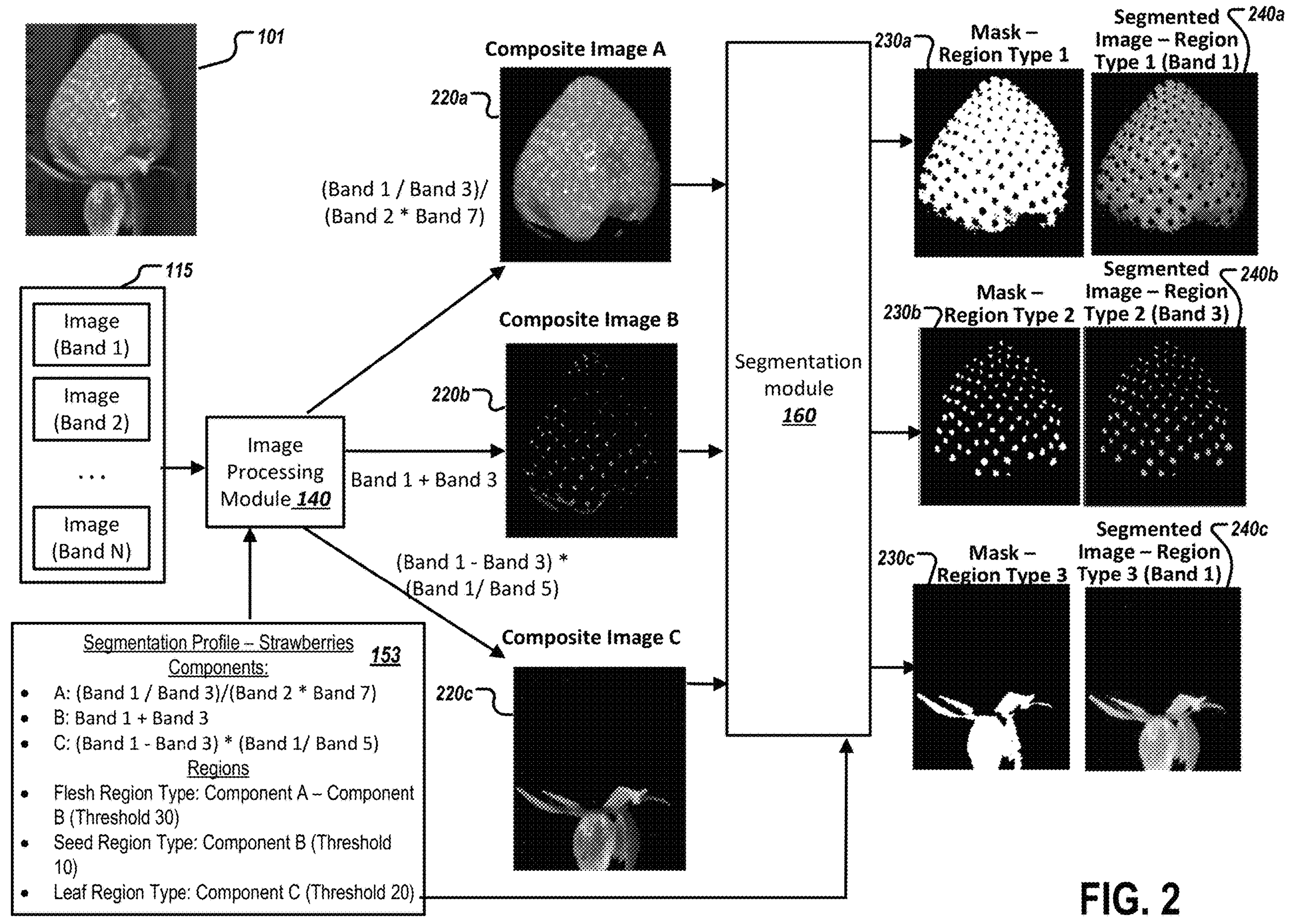
FIG. 2 is a diagram illustrating an example of performing enhanced image segmentation using a profile to select different subsets of wavelength bands of a hyperspectral image to segment different types of regions of an object.

FIG. 1 is a block diagram of an example system 100 implemented to perform band selection and image segmentation of a hyperspectral image. The system 100 includes a camera system 110 for capturing images (e.g., hyperspectral images) of objects. Each of one or more of the captured images may comprise image data for each of multiple bands, where each band represents measurement of reflected light for a particular band of wavelengths. FIG. 1 further illustrates an example flow of data, shown in stages (A) to (E). Stages (A) to (E) may occur in the illustrated sequence, or they may occur in a sequence that is different than in the illustrated sequence.

The system 130 can be used to select bands and/or image features to perform image segmentation for many different applications. For example, the system can be used to select bands for identifying and evaluating different types of fruit, vegetables, meats, and other foods. As another example, the system can be used to select bands and/or features for identifying and evaluating waste materials, such as detecting the material type of recyclables as well as detecting the presence of additives or contamination.

In the application of optical sorting and classification of plastics, the system can significantly improve the discriminating power of the system by utilizing strategic preprocessing techniques, utilizing strategic processing techniques, and/or generating combined or synthetic bands of image data and discovering which bands to use to detect different materials. For example, the preprocessing may include, performing a normalization to reference images, generating a derivative function, detecting a frequency corresponding to a baseline (or zero) crossing, performing a filtering, generating a convolution, and/or performing another calculation and then generating an output (e.g., a frequency with a detected baseline crossing, a convolution summation statistic, etc.). As another example, an analysis can be performed to determine which bands and/or features best discriminate between different base plastic types, as well as discriminating these from other common materials. Similarly, the analysis can be used to select the bands that best discriminate a base type of plastic without additives (e.g., pure PE) from that type of plastic with one or more additives (e.g., phthalates, bromides, chlorates, etc.), as well as for discriminating between regions that are uncontaminated from regions that have different types of surface contaminants. The selection of bands may be dependent on the type of base plastic, which sets the baseline amount of reflectance (or absorptance or absorbance) and variation in certain spectral regions. Thus different combinations of bands may be selected for identifying regions of different additives or contaminants are present. In some implementations, the band selection can be informed by the set of materials to be discriminated between and the specific types of additives and contaminants of interest.

In the example of FIG. 1 the camera system 110 takes hyperspectral images 115 of an object 101, which is a strawberry in the illustration. Each hyperspectral image 115 comprises image data for N bands. Generally, a hyperspectral image can be considered to have three dimensions, x, y and z where x, y represent the spatial dimension of a 2D image for a single band, and z represents an index or step through the number of wavelength bands. Thus, a hyperspectral image includes multiple two-dimensional images, where each image is represented by x and y spatial dimensions and each image represents the captured light intensity (e.g., reflectance) of the same scene for a different spectral band of light.

It will be appreciated that an image collected by the camera system 110 and analyzed may include a non-hyperspectral image, and disclosures herein that refer to a hyperspectral image may be adapted to use non-hyperspectral image. For example, the camera system 110 may include a lens with low absorption in the visible range, near infrared range, short-wave infrared range, or mid-wave infrared range. Thus, the captured image may depict signals in the visible range, near infrared range, short-wave infrared range, or mid-wave infrared range, respectively. The camera system 110 can include any of a variety of illumination sources, such as a light emitting diode (which may be synchronized to the camera sensor exposure), incandescent light source, laser, and/or black-body illumination source. A light emitting diode included in camera system 110 may have a peak emission the coincides with a peak resonance of a given chemical of interest (e.g., a given type of plastic) and/or a bandwidth that coincides with multiple molecular absorptions. In some instances, multiple LEDs are included in camera system 110, such that a given specific spectral region can be covered. LED light sources provide coherent light, and controlling emission and signal to noise may be more feasible than for other light sources. Further, they are generally more reliable and consume less power relative to other light sources.

In some instances, camera system 110 is configured such that an optical axis of a lens or image sensor of the camera is between 75-105 degrees, 80-90 degrees, 85-95 degrees, 87.5-92.5 degrees, 30-60 degrees, 35-55 degrees, 40-50 degrees, 42.5-47.5 degrees, or less than 15 degrees relative to a surface supporting the object(s) being imaged (e.g., a conveyor belt). In some instances, the optical system includes multiple cameras, where an angle between an optical axis of a first camera relative to a surface supporting the object(s) is different than an angle between an optical axis of a second camera relative to the surface. The difference may be (for example) at least 5 degrees, at least 10 degrees, at least 15 degrees, at least 20 degrees, at least 30 degrees, less than 30 degrees, less than 20 degrees, less than 15 degrees, and/or less than 10 degrees. The difference may facilitate detecting signals from objects having different shapes or being positioned at different angles relative to an underlying surface (e.g., having different tilts). In some instances, a first camera filters for a different type of light relative to a second camera. For example, a first camera may be an infrared camera, and a second camera may be a visible-light camera. In some instances, camera system 110 includes a light source that is in a specular reflection condition relative to the camera and a second light source in a diffuse reflection condition relative to the camera (e.g., facilitate detecting objects with different specular and diffuse reflectances).

The camera system 110 may include a light guide (e.g., of a fiber-optic, hollow, solid, or liquid-filled type) to transfer light from an illumination source to an imaging location, which can reduce heat released at the imaging location. The camera system 110 may include a type of light source or light optics such that light from the light source(s) is focused to a line or is focused to match a projected size of an entrance slit to a spectrograph. The camera system 110 may be configured such that an illumination source and imaging device (camera) are arranged in a specular reflection condition (so as to generate a bright-field image), in a non-specular (or diffuse) condition (so as to generate a dark-field image) or a mixture of the conditions. Most hyperspectral images have image data for each of several or even dozens of wavelength bands depending on the imaging technique. In many applications, it is desirable to reduce the number of bands in a hyperspectral image to a manageable quantity because processing images with high numbers of bands is computationally expensive (resulting in delay in obtaining results and high power use), because the high dimensional space may prove infeasible to search or have unsuitable distance metrics ("the curse of dimensionality"), or because the bands are highly correlated ("the problem of correlated regressors"). Many different dimensionality reduction techniques have been presented in the past such as principal component analysis (PCA) and pooling. However, these techniques often still carry significant computational cost, require specialized training, and do not always provide the desired accuracy in applications such as image segmentation. In addition, many techniques still attempt to use most or all bands for segmentation decisions, despite the different wavelength bands often having dramatically different information value for segmenting different types of boundaries (e.g., boundaries of different types of regions having different properties, such as material, composition, structure, texture, etc.). This has traditionally led to inefficiency of processing image data for more wavelength bands than are needed for a segmentation analysis. It has also limited accuracy as data for bands that have low relevance to a segmentation boundary obscure key signals in the data with noise and marginally relevant data.

In particular, the importance of different wavelength bands to a segmentation decision varies greatly from one type of region to another. Out of 20 different wavelength bands, one type of region (e.g., having a certain material or composition) may interact strongly with only a few of the total bands imaged, and a second type of region (e.g., having a different material or composition) may interact strongly with a different subset of the total number of bands imaged. Many prior systems did not have the ability to determine, store, and use region-dependent variations in which subsets of bands produced the best segmentation results, which often led to inefficient processing of band data that is marginally relevant or irrelevant to the segmentation of at least some regions of interest. As discussed below, the techniques discussed herein allow the segmentation parameters for each object type and region type to be determined based on analysis of training examples and stored, then used to better identify and distinguish each type of region of interest for a type of objects. This can be done for many different object types, enabling the system to select the profile for different objects or scenes and use the appropriate sets of bands and parameters to segment the various region types that may be present for different objects or scenes.

In the example of FIG. 1, the camera system 110 includes or is associated with a computer or other device that can communicate over a network 120 with a server system 130 that processes hyperspectral image data and returns segmented images or other data derived from the segmented images. In other implementations, the functions of the computer system 130 (e.g., to generate profiles, to process hyperspectral image data, to perform segmentation, etc.) can be performed locally at the location of the camera system 110. For example, the system 100 can be implemented as a standalone unit that houses the camera system 110 and the computer system 130.

The network 120 can include a local area network (LAN), a wide area network (WAN), the Internet or a combination thereof. The network 120 can also comprise any type of wired and/or wireless network, satellite networks, cable networks, Wi-Fi networks, mobile communications networks (e.g., 3G, 4G, and so forth) or any combination thereof. The network 120 can utilize communications protocols, including packet-based and/or datagram-based protocols such as internet protocol (IP), transmission control protocol (TCP), user datagram protocol (UDP), or other types of protocols. The network 120 can further include a number of devices that facilitate network communications and/or form a hardware basis for the networks, such as switches, routers, gateways, access points, firewalls, base stations, repeaters or a combination thereof.

In some implementations, the computer system 130 provides a band selection and image segmentation module that analyzes the image and provides as output the selected band configurations and the segmented images. In some implementations, the computer system 130 can be implemented by a single remote server or by a group of multiple different servers that are distributed locally or globally. In such implementations, the functions performed by the computer system 130 can be performed by multiple distributed computer systems and the machine learning model is provided as a software service over the network 120.

Briefly, FIG. 1 shows an example where the computer system 130 generates segmentation profiles for object types and/or region types through analysis of various training examples. The computer system 130 then receives an additional hyperspectral image and uses the profile for the object type of an object in the image to efficiently generate an accurate segmentation result. While FIGS. 1, 2, 5, and 6A-6B illustrate a strawberry as the type of object to be detected and evaluated, the same techniques described can be used to process other types of objects.

During stage (A), as a setup process, the computer system 130 generates a profile for a type of object for which images are to be segmented. For example, to enable the system to segment images of strawberries, a profile 153 for the strawberry object type can be created. The profile 153 can specify a subset of bands to use when segmenting strawberries, or more potentially even different bands to use for segmenting different types of regions of strawberries.

To generate the profile for an object type, the computer system 130 processes various training examples 151 that include hyperspectral images of instances of the object type to be profiled. Each of the hyperspectral images may be preprocessed according to one or more techniques. The preprocessing may include (for example) modifying—for each pixel in a hyperspectral image—the spectrum that corresponds to the pixel. The modification may include (for example) calculating a first derivative of the spectrum, calculating a second derivative of the spectrum, convolving the spectrum (or a derivative or second derivative of the spectrum) with each of one or more kernels (e.g., a Gaussian kernel, a single-cycle sine-wave kernel, or a kernel having a signature of a given type of material), removing a baseline from the spectrum and/or normalizing the spectrum based on one or more reference spectra (e.g., corresponding to light and dark conditions—where a light source in camera system 110 is fully on or fully off—with no object in a field of view). For example, the removal of the baseline and/or normalization may be performed to produce a result that indicates—for each of a set of frequency bands—where an intensity at the frequency band in the spectrum falls relative to a maximum value corresponding to the light condition and a minimum value corresponding to the dark condition.

In some implementations, the band evaluation module 150 performs a band selection process in which each of the bands of processed hyperspectral images are analyzed to generate a selected band configuration that enables high accuracy while performing hyperspectral image segmentation.

The band evaluation module 150 can perform an iterative process of band selection 152 for object types and/or region types. During the first iteration, the individual bands of the hyperspectral images undergo a selection process 152*a*. The process 152*a* selects a subset of bands from the multiple bands of the hyperspectral training images. For example, during the first iteration, the module 150 evaluates the bands 1 to N of the various hyperspectral image training examples 151, giving a score to each band indicating how well the band discriminates between a particular type of region of interest (e.g., flesh of a strawberry) and other regions (e.g., leaves, seeds, background, etc.). In the example, the first iteration of the process 152 selects band 1 and band 3 from bands 1 to N. As another example, the module 150 may identify bands associated with (for example) a peak in a spectrum, a crossing of a threshold in a derivative or second derivative of a spectrum, a local minimum in a spectrum, etc.

In some implementations, after the selection of the subset of individual bands, synthetic bands or altered bands are generated. The synthetic bands can be generated by processing the image data for one or more of the bands selected in the first iteration. For example, each band within the subset of bands can undergo one or more operations (e.g., image processing operations, mathematical operations, etc.), which can include operations that combine data from two or more different bands (e.g., of those selected in the first iteration). Each of various predetermined functions can be applied to the image data for different combinations of the selected bands (e.g., for each pair of bands or each permutation within the selected subset of bands). This can create a new set of synthetic bands each representing a different modification to or combination of bands selected in the first iteration. For example, upon selection by the selection process 152*a*, the module 150 performs operations on band 1 and band 3 to create three new synthetic bands comprising: (1) band 1+band 3; (2) band 1/band 3; and (3) band 1−band 3. The synthetic bands can also be derived from convolutions or projections applied to the image data, which are functions that map a group of pixels and single pixels, respectively, to single numbers. A single or multiple convolution and/or single and multiple projections can be applied across the entire image to create new synthetic bands.

The synthetic bands created in this manner are then evaluated, for example, scored to determine the level with which they each discriminate between a region type of interest (e.g., flesh of a strawberry) and other region types. The computer system 130 then selects from among the synthetic bands in a selection process 152*b* for the second iteration. In the example, the synthetic band created as band 1-band 3 is selected by the process 152*b*. The iterative process of generating new modified or composite bands and then selecting the most effective among them can continue until a desired level of accuracy is reached.

In the example, the information for segmenting flesh of a strawberry is distilled or aggregated into a single 2D image. However, this is not required, and in some implementations, the profile 153 may indicate that multiple separate bands (e.g., original or synthetic/modified) are to be generated and used for segmentation. For example, the system may specify that segmentation is to use image data for three bands, band 1+band 3, band 1/band 3, and band 1−band 3.

The band evaluation module 150 performs the selection process for each of the multiple region types of the type of object for which the profile 153 is being generated. This produces, for each region type, a selected subset of bands to be used for that region type. When the selected bands are synthetic bands, the component input bands and the functions to be applied to generate the synthetic bands are stored in the profile. The result is that the profile 153 for an object type may include a selected band configuration to be used for each region type of the object, enabling high accuracy for image segmentation for each of the region types. For example, for a profile 153 for segmenting strawberries, the region types may be leaves, seeds, and flesh. As another example, in a profile for segmenting elements of dining rooms, the multiple region types may include chairs as the first region, tables as the second region, and walls as the third region.

In some implementations, the region types for the profile 153 represent regions of different materials, so that segmentation can facilitate distinguishing among regions of different materials depicted in an image. The band evaluation module 140 generates a band configuration for each material type to enable high accuracy while performing image segmentation. For example, for assessing furniture, the multiple material types include wood, plastic, and leather. More generally, the selection can determine the image band parameters for any of various properties, including material, composition, texture, density, structure, and so on.

In some implementations, the band evaluation module 150 performs the selection and operation process 152 for each of the multiple condition types of the object. For example, the flesh of a strawberry may be considered to have regions of different types, such as ripe, unripe, bruised, mildewed, etc. The band evaluation module 150 can generate and store in the profile 153 a band configuration for each type of condition that enables high accuracy of distinguishing regions of the different conditions while performing image segmentation.

The process of generating profiles discussed for stage (A) can be performed for many different object types, to create a library of segmentation profiles 153 that are stored and can be retrieved by the system 130 to accurately segment each of the different object types. For each object type, there may be multiple different region types specified, each having corresponding wavelength bands, operators, algorithms, and other parameters specified to be used for segmenting image regions of that region type.

During stage (B), the camera system 110 captures a hyperspectral image of an object. For example, the camera system 110 takes a hyperspectral image 115 of a strawberry 101 that includes image data for each of N different wavelength bands. In some implementations, the hyperspectral image 115 can be sent as one of many in a series of images of different objects, such as objects on a conveyor for manufacturing, packaging, or quality assurance.

During stage (C), the hyperspectral image 115 is transmitted from the camera system 110 to the computer system 130, for example, using the network 120. The hyperspectral image 115 can be transmitted in association with a request for processing the image, such as to generate a segmented image, to examine the characteristics or quality of an object represented in the image, or for another purpose.

During stage (D), upon receiving the hyperspectral image 115, the computer system 130 performs processing (and potentially also pre-processing) to identify and generate the image data for the different types of regions to be segmented. As noted herein, the pre-processing may include (for example) modifying—for each pixel in a hyperspectral image—the spectrum that corresponds to the pixel. The modification may include (for example) calculating a first derivative of the spectrum, calculating a second derivative of the spectrum, convolving the spectrum (or a derivative or second derivative of the spectrum) with each of one or more kernels (e.g., a Gaussian kernel or a kernel having a signature of a given type of material), removing a baseline from the spectrum and/or normalizing the spectrum based on one or more reference spectra (e.g., corresponding to light and dark conditions with no object in a field of view). Removing a baseline from a spectrum may (for example) reduce or remove a signal component attributed to $CO_2$ in the environment. Normalizing a spectrum using a reference spectrum may result in more consistent spectra results despite variability in intensities of a light source (e.g., over time or relative to another light source).

The processing can include pre-segmentation steps of identifying an object type represented in the hyperspectral image 115, retrieving the profile 153 for the object type (e.g., from a database and from among profiles for multiple different object types), pre-processing the image data for different bands (e.g., generating synthetic or composite images, applying thresholds, functions, or filters, etc.), reducing the number of images (e.g., projecting or combining image data from multiple bands into fewer images or a single image), and/or otherwise preparing the hyperspectral image 115 for segmentation processing with the parameters in the profile 153. In some instances, the processing includes detecting a peak (e.g., in a spectrum or pre-processed version thereof), a baseline-crossing (e.g., in a spectrum or a first or second derivative thereof), or a zero-crossing (e.g., in a first or second derivative of a spectrum). A frequency band(s) at which each peak, baseline-crossing, or zero-crossing was detected can be identified and used as a feature that characterizes the spectrum.

The computer system 130 identifies the object type of the object 101 represented in the hyperspectral image 115, then selects and retrieves the segmentation profile 153 corresponding to that image type. Data provided in connection with the hyperspectral image 115 can indicate the type of object 101 represented in the image. For example, a request for processing the hyperspectral image 115 can include an indication that the object to be evaluated is of the "strawberry" object type. As another example, the system 100 may be arranged to repeatedly process hyperspectral images showing the same type of object, so that the computer system 130 is already configured to interpret or process the incoming hyperspectral image 115 as an image of a strawberry. This may be the case in a manufacturing facility or packaging workflow where items of the same type are sequentially processed. In yet another example, the computer system 130 may use an object recognition model to detect a type of object represented in the hyperspectral image 115, and then select the profile corresponding to the automatically identified object type.

With the appropriate profile 153 selected for the object type of the object pictured in the hyperspectral image 115, the computer system 130 applies the information in the selected profile 153 to process the hyperspectral image 115. For example, the profile 153 may specify different composite or synthetic images to generate from the image data for different bands in the hyperspectral image 115. The computer system 130 may generate these images, as well as apply any other algorithms or operations the profile specifies. As a result, the module 140 prepares one or more images on which the segmentation processing is applied. In some cases, this may result in a single 2D image, or different 2D images for each of various different region types to be segmented, or multiple 2D images for each of multiple different region types. In effect, the module 140 can act as a pre-processing stage, using the profile 153 to filter out image data for bands that are not relevant to a given region type and processing the image data to an appropriate form for segmentation.

During stage (E), the segmentation module 160 performs segmentation based on the processed image data from the image processing module 140. Segmentation can determine the boundaries of different objects and different types of regions of those objects. One way to look at the segmentation process is that the module 160 can classify the different areas of the images it received (which represent the corresponding hyperspectral image 115) into classes or categories, e.g., assigning pixels as one of various types, background or not part of the object, leaves, seeds, flesh, etc. For example, the image data for selected band configuration, as generated by the image processing module 140, can have any of various segmentation algorithms applied, such as thresholding segmentation, clustering segmentation, compression-based segmentation, histogram-based segmentation, edge detection, region-growing techniques, partial-differential equation-based methods (e.g., curve propagation, parametric methods, level-set methods, fast marching methods, etc.), graph partitioning segmentation, watershed segmentation, model-based segmentation, multi-scale segmentation, multi-spectral segmentation, and so on. The segmentation algorithms can use parameters (e.g., thresholds, weights, references, different models or model training states, etc.) specified by the profile 153 for each region type, so that different segmentation parameters or even different segmentation algorithms may be used to identify different region types. The results of segmentation can be expressed as an image. One example is an image that provides 2D pixel grid, where pixels are given a value of "1" when they correspond to a particular region type (e.g., leaves) and given a value of "0" otherwise.

In the example, the profile 153 specifies three region types, leaves, seeds, and flesh of a strawberry. The profile 153 specified these three regions to be segmented as well as the bands and parameters to use in identifying where these three regions are present. The segmentation module 160 generates an output 160 that includes three images, one for each of the three different region types. Each image thus corresponds to a different region type and specifies the areas, out of the 2D field of view of the hyperspectral image 115, that are occupied by instances of a particular region type. In other words, the segmented images can include an image mask or otherwise specify boundaries of the regions where a certain region type is identified to be present. In some cases, areas of different region types can be specified all in a single image, with different values classifying different pixels as corresponding to different regions (e.g., 0 for background or not part of the object, 1 for leaves, 2 for seeds, 3 for flesh of the strawberry, etc.).

During stage (F), the system 130 stores the segmentation results 160 and uses them to generate and provide output. Even though the segmentation boundaries were generated using image data for a subset of the bands in the hyperspectral image 115, the boundaries determined can be used to process the image data for each of the bands of the hyperspectral image 115. For example, a hyperspectral image may have image data for 20 different bands, and the segmentation process may use image data for only bands 1 and 2. The resulting region boundaries determined may then be applied to segment or select the defined regions in image data for all 20 of the different bands. Because the images for different bands of the hyperspectral image 115 share the same view and perspective of the object 101, segmentation based on image data for one band can be directly applied (e.g., overlaid, projected, or otherwise mapped) to the image data for the other bands. This way, the segmentation can be applied consistently across all of the images within the hyperspectral image 115.

The segmentation results 160 can be stored in a database or other data storage, in association with a sample identifier for the object 101 and with the hyperspectral image 115 captured. For quality control and manufacturing uses, the system 130 can use the association as part of detecting and logging defects, tracking quality and characteristics of specific objects as they move through a facility, assisting with sampled analysis of a lot or batch of objects, and so on. Some of the common functions that the system 130 can use the segmented hyperspectral image data to perform include characterizing the object 101 or specific portions of it, such as assigning scores for the composition, quality, size, shape, texture, or other properties. Based on these scores, or potentially as a direct output of image analysis without intermediate scores, the computer system 130 can classify objects based on the segmented hyperspectral image data. For example, the system 130 can sort objects into categories, such as different quality grades, and direct them with a conveyor system to different areas based on the categories assigned. Similarly, the system 130 can detect objects with defects and remove them from a manufacturing or packaging pipeline.

The segmentation results 160, results of applying the segmentation to the hyperspectral image 115, and/or other information generated using them can be provided. In some implementations, one or more images indicating the segmented boundaries are transmitted to the camera system 110 or another computing device for display or further processing. For example, the boundaries of different region types determined through segmentation can be specified in annotation data that overlays the region boundaries and indicates region types for the hyperspectral image 115 or for a composite image or standard color (e.g., RGB) image of the object 101.

In some implementations, the computer system 130 performs further processing on the segmented images, such as to generate input feature values from the pixel values for certain segmented regions and providing the input feature values to a machine learning model. For example, a machine learning model may be trained to classify objects such as strawberries based on characteristics such as size, shape, color, consistency of appearance, absence of defects etc. The computer system 130 may use the region boundaries determined through segmentation to isolate, from the hyperspectral image 115, the image data for various spectral bands that correspond to an individual strawberry and/or to specific types of regions of the strawberry. Thus the computer system 130 can provide, as input to a trained machine learning model, an input image that excludes background elements and other objects and instead provides only the regions that are showing part of the strawberry, or only provides regions that show a certain part of the strawberry (e.g., flesh of the strawberry, omitting the seeds and leaves).

In some cases, the input provided to a machine learning model can be derived from segmented images, without providing image data itself to the model. Examples include the ratio of a number of pixels classified as one region type to pixels classified as being of another region type (e.g., amount of seed region pixels to an amount of flesh region pixels), an average intensity (potentially for each of various spectral bands) of pixels segmented to be of a certain region type (e.g., flesh of the strawberry), and a distribution of intensities of pixels segmented as being of a certain region type. In some instances, the spectrum from each pixel in a region is pre-processed in accordance with a technique disclosed herein and the pre-processed spectra are analyzed to generate a feature. Exemplary features include: a percentage of the spectra for which a crossing of baseline (or of zero) is observed at a particular frequency band, an average integral of the convolutions of the spectra (or a derivative or second derivative of the spectra) with a given kernel, a median number of peaks detected in the spectra, a median number of zero crossings detected in the first derivatives of the spectra, an average ratio between the intensities in the spectra at a first frequency band and the intensities in the spectra at a second frequency band, etc.

Machine learning models 170 can be trained to perform various different functions, such as to classify the condition of an object or estimate characteristics of the object. For a strawberry, the machine learning models may use segmented input image data to determine a classification (e.g., good condition, unripe, bruised, mildewed, etc.). Machine learning models can also be trained to provide scores or classifications for hyperspectral-image-based prediction of specific properties, such as chemical content, strength, defect type or defect density, texture, color, and so on. The machine learning models 170 can be neural networks, classifiers, decision trees, random forest models, support vector machines, or models of other types. The results of machine learning models processing segmented hyperspectral image data or input features derived from the hyperspectral image data can be stored in a database for later use and may be provided to any of various devices, e.g., to a client device for display to a user, to a conveyor system to direct the object 101 to one of multiple locations, to a tracking system, etc. For example, the results of machine learning models that classify an object 101 can be used to generate instructions sent to sorting equipment 180 (e.g., causing the sorting equipment 180 to physically move or group objects according to the characteristics indicated by the machine learning model results), to packaging equipment to specify how and where to package the object 101, to robotic arms or other automated manipulators for moving or adjusting the object 101, or otherwise manipulating the object 101.

The techniques of FIG. 1 can also be applied to assess other types of materials, such as plastics and other recyclables. For example, the techniques may be used to improve the efficiency and accuracy of characterizing chemical or material identities of waste materials, allowing items to be sorted by material type, presence of additives, presence of contaminants, and other properties determined through computer vision. This analysis can be used to improve both mechanical and chemical recycling processes.

Mechanical recycling is the dominant strategy for recycling plastic and involves grinding, melting, and re-extruding plastic waste. Recycling facilities are frequently designed to process streams of sorted materials with high purity, to retain a high level of material performance in recycled products. However, feedstock impurity reduces the effectiveness of recycling, due to complex formulations with additives, as well as the physical degradation of materials, even just after a few cycles of mechanical recycling. For example, with plastic materials, polylactic acid (PLA) is a common waste plastic often undetected in polyethylene terephthalate (PET) sorting and mechanical recycling operations. As another example, chlorinated compounds such as polyvinyl chloride (PVC) are not tolerated in both mechanical and chemical recycling operations, because corrosive compounds are produced during recycling processes, which limits the value of hydrocarbon outputs.

Mechanical recycling is limited in its applicability to mixed, composite, and contaminated waste streams, in part because it employs mechanical separation and reformation processes that are insensitive to chemical contaminants and may be unable to modify the chemical structure of waste material. The system 130 can improve the effectiveness of mechanical recycling through improved identification and classification of plastics and other materials, leading to more accurate sorting of materials and thus higher-purity, more valuable recycling feedstock. In addition, the system 130 can use imaging data to detect the presence and type of additives and contaminants, allowing materials with these compounds present to be processed differently or removed.

Chemical recycling may resolve some limitations of mechanical recycling by breaking the chemical bonds of waste materials into smaller molecules. For example, in the case of polymeric materials, chemical recycling may provide an avenue to recover oligomers, monomers, or even basic molecules from a plastic waste feedstock. In the case of polymers, chemical recycling processes may include operations to depolymerize and dissociate the chemical makeup of a complex plastic product, such that its by-products can be up-cycled into feedstocks for new materials. Elements of chemical recycling may permit a material to be repeatedly dissociated into primary feedstock materials. In this way, rather than being limited by chemical structure and material integrity to a limited number of physical processes, as in mechanical recycling, chemical recycling may be integrated into an ‘end-to-end’ platform to facilitate reuse of molecular components of recyclable materials. For example, the products of chemical recycling may include basic monomers (ethylene, acrylic acid, lactic acid, vinyl, etc.), feedstock gases (carbon monoxide, methane, ethane, etc.), or elemental materials (sulfur, carbon, etc.). Instead of being limited to a single group of recycled products, based on the molecular structure of the input waste material, products may be identified that can be synthesized from intermediary chemicals that can be produced from the waste by chemical reactions. In so doing, the end-to-end platform may manage a waste stream by generating a chemical reaction scheme to convert the waste material into one or more target products. For example, the end-to-end platform may directed a waste feedstock to a chemical recycling facility, for chemical conversion of the waste material into a target product.

The capabilities of the system 130 can also improve the effectiveness of chemical recycling. For example, the system 130 captures hyperspectral images of a waste stream on a conveyor belt and uses the techniques of FIG. 1 to detect which materials are present. For example, the camera system 110 may collect line scans along the width of the conveyor belt, which can then be analyzed (e.g., by feeding features derived from preprocessed spectra to a machine-learning model) to predict which chemicals are in an object passing by on the conveyor belt. The system 130 can also estimate the amounts of different materials that are present, e.g., based on the size and shape of different types of regions identified, and the proportions of different materials present. The system 130 can also detect which additives and contaminants are present. From this information about the composition of the waste stream, the system 130 can modify or update chemical processing parameters to change target product quantities, endpoints, or chemical structures. Some of these parameters can include changes in the conditions of processing (e.g., residence time, reaction temperature, reaction pressure, or mixing rates and patterns) as well as the types and concentrations of chemical agents used (e.g., include input molecules, output molecules, catalysts, reagents, solvents). The system 130 can store a table, equation, model or other data that specifies processing parameters for different input types (e.g., different mixes or conditions of input materials), and the system 130 can use the stored data to determine the instructions to processing machinery to implement the needed processing conditions. In this manner, the system 130 can use analysis of hyperspectral imaging data of a waste stream to adjust the chemical recycling processing parameters so that they match the material characteristics of the waste stream. The monitoring can be performed on an ongoing basis, so that as the mix of materials in a waste stream changes, the system 130 varies the processing parameters appropriately for the incoming mix of materials.

As an example application of the technique shown in FIG. 1 to recycling, the camera system 110 can be arranged to capture hyperspectral images of waste materials as the object 101 being imaged. In some implementations, the camera system 110 is arranged to capture hyperspectral images of waste materials on a conveyor. The waste material may include many objects of different types and compositions imaged in a single image. Results of processing the images are used to generate instructions for equipment to sort the waste material and optionally mechanically or chemically process the waste material.

During stage (A), as a setup process, the computer system 130 generates a profile for one or more types of materials of interest. Different profiles can be generated for different plastic types (e.g., PE, PET, PVC, etc.). The profile may include a spectrum and/or features of a spectrum. Information to facilitate segmentation and detection of additives and contaminants can be included in the basic material profiles or in other profiles. For example, in this application, the profile 153 shown in FIG. 1 may represent a profile for PET and can indicate a subset of spectral bands to use when segmenting regions consistent with PET. The profile 153 may also indicate different subsets of bands to respectively use for segmenting different types or variations of PET, or for segmenting regions with different types of additives or contaminants. The profile 153 may also or alternatively identify features, such as a band corresponding to a zero-crossing in a derivative of a normalized spectrum, a function of a convolution of a preprocessed spectrum (or a derivative or second derivative of the spectrum) with a kernel, a projection of a spectrum into a new vector space, etc.

Using the techniques discussed above, the computer system 130 generates a profile for a material by processing various training examples 151 that include hyperspectral images of instances of the material to be profiled. The training examples can include examples showing a target material to be identified (e.g., PET) in the presence of various other different materials, including other waste materials such as other types of plastics. The training examples 151 can include at least some examples of images of the material with regions where additives or contaminants are present, so the system 130 can learn which bands and/or features distinguish a clean or pure region of the material from regions where various additives or contaminants are present.

The band evaluation module 150 performs a band selection process in which each of the bands and/or features of processed hyperspectral images are analyzed to generate a selected configuration that enables high accuracy for segmenting the desired material from other types of materials, especially other types of plastic and other waste materials likely to be imaged with the material of interest. As discussed above, the band evaluation module 150 can perform an iterative process of band selection 152 for each of multiple different material types and/or region types. For segmentation of regions for different base plastic types, the system 130 can use a clustering technique, a component analysis (e.g., principal component analysis or independent component analysis) or a support vector machines (SVM) to determine the change or difference between different pixel groups resulting from using different bands to discriminate between materials. In some cases, the pixel intensities for each type of plastic can be clustered together and the difference between the clusters (e.g., between average values for the cluster) can be determined. In general, the band and/or feature selection analysis can attempt to maximize the difference or margin between pixel groups for different materials.

For example, to distinguish between PE, PET, PVC, and PP, the band evaluation module 150 can assess the differences in pixel intensities (or intensities of a derivative or second derivative of a raw or preprocessed spectrum) in different spectral bands and identify bands that provide the greatest and most consistent amount of difference (e.g., margin) between the reflected (or absorbed) intensity for the different plastics. To illustrate, the band evaluation module 150 may determine that a first band has similar average reflectance for each of the four plastic types above, but that a second band shows a greater amount of difference in reflectance for at least some of the plastic types. The analysis may be done in a pairwise manner to identify which bands are most effective at distinguishing between which pairs of materials. In various iterations, the band selection module 150 can select the bands with the greatest discriminating power (e.g., highest margin between pixel intensity groupings) and make different combinations of these to generate synthetic bands that are in turn evaluated in the same manner, until a maximum number of iterations is reached or the margin meets a minimum threshold for discriminating ability. This process can similarly be used to determine the bands and synthetic bands that best distinguish plastics with additives or contaminants from pure base plastics.

As another example, to distinguish between PE, PET, PVC, and PP, an evaluation module 150 can identify one or more kernels that can be used to convolve a spectrum (or preprocessed version thereof). Functions of the convolution may then be defined as a feature, such that each spectrum is associated with a value for each of the one or more kernels. In some cases this value may simply be the scalar projection of the spectrum onto another vector, or many such values could be generated by the projection on a basis for a vector space. In some instances, each of the one or more kernels corresponds to a chemical (e.g., and includes a spectrum or preprocessed version of a spectrum of the chemical). In some instances, each of the one or more kernels corresponds to a higher level shape or attribute.

As a result of the band selection, the system 130 may determine, for example, that a first subset of bands or that a first set of features that provides the discrimination of a desired plastic type (e.g., PET) from other plastics or waste materials (e.g., that is better than a discrimination provided by one or more other bands or one or more other features) and/or that a second, different subset of bands or a second set of features is effective for segmenting a certain additive or contaminant, (e.g., that is better than a segmenting provided by at least one other band or at least one other feature), such as oil as food residue. This can include generation of and evaluation of synthetic bands that combine data from multiple different spectral bands of the original hyperspectral image. This results in a repository of profiles for different materials, each indicating the best parameters and subsets of bands that the system identified for distinguishing a target material from other materials it is likely to be near.

Continuing the application of the technique of FIG. 1 to the recycling application, during stage (B), the camera system 110 captures a hyperspectral image of a waste stream. For example, the camera system 110 takes a hyperspectral image 115 of a waste stream on a conveyor on its way to sorting or other processing. During stage (C), the hyperspectral image 115 is transmitted from the camera system 110 to the computer system 130, for example, using the network 120. The hyperspectral image 115 can be transmitted in association with a request for processing the image, such as to generate a segmented image, to identify the materials represented in the image 115, to determine the amount of one or more particular materials represented by the image, to assess the level or type of contamination of a sample, or for another purpose.

During stage (D), the computer system 130 retrieves the profiles for different types of materials to be identified in the hyperspectral image data 115. Based on the information in the profiles, the computer system 130 may select one bands, may generate one or more synthetic bands, and/or may identify one or more features of image data for identifying each different type of region to be detected. For example, the profiles can specify different sets of bands for different plastic types, and also for different additives and contaminants. To illustrate, one set of bands may be used for segmenting clean PET regions, another set of bands for segmenting oil-contaminated PET regions, a third set of bands for segmenting regions of PET having a particular additive, and so on. Meanwhile, one or more bands, synthetic bands or features may be used to predict whether a depicted object includes any of a set of chemicals (and/or a portion of the object that includes the chemical).

During stage (E), the segmentation module 160 performs segmentation based on processed image data from the image processing module 140. For plastic recycling, the segmented areas can be areas of different plastic types (e.g., PET, PE, PVC, etc.) as well as regions where additives or contamination are present (e.g., PE with oil contamination, PET with a UV-resistant additive, etc.). The system 130 can perform further processing to interpret the segmented results, such as to count the number of different items or regions of each type, to determine the areas covered by each region type (e.g., as indicator for the amount and proportions of the different materials), and so on.

During stage (F), the system 130 stores the segmentation results 160 and other data characterizing the regions imaged. The system 130 can store metadata that marks specific objects or regions in the imaged area (e.g., waste material on a conveyor) with the material type determined through the segmentation analysis. The boundaries of different regions, as well as the area or proportion of different region types can be stored as well. The system 130 can then use this information to generate instructions for processing the waste material. For example, the system 130 can provide the information to a mechanical sorting machine to direct different pieces of plastic to different bins, conveyors, or other devices according to the type of plastic detected. As another example, the system 130 can identify plastic items that have one or more additives and separate them from plastics without the additives. Similarly, the system 130 can identify items that have at least a minimum amount of contamination (e.g., at least a minimum area with a contaminant present) and remove these items to avoid contaminating the rest of the recycling feedstock. More generally, the system 130 can use the segmented hyperspectral image data to characterize various properties of the waste material, such as assigning scores for any of various properties of materials detected. Based on these scores, or potentially as a direct output of image analysis without intermediate scores, the computer system 130 can classify portions of the waste materials or classify the set of waste materials as a whole.

As discussed above, the segmentation results 160, results of applying the segmentation to the hyperspectral image 115, and/or other information generated using them can be provided to other devices for display or further processing. Segmented images can also be used by the computer system 130 or another system to generate input for one or more machine learning models. For example, the computer system 130 can generate input feature values from the pixel values for certain segmented regions and provide the input feature values to a machine learning model. For example, a machine learning model may be trained to classify an item or a set of items as recyclable or not based on the type of plastic and amount and types of additives and/or contamination present. The computer system 130 may use the region boundaries determined through segmentation to isolate, from the hyperspectral image 115, the data that is respectively for regions of different material types, different additives, or different contaminants. In some cases, information from the hyperspectral image data for segmented regions may be indicative of further characteristics of the material, e.g., the density, thickness, quality of material, etc., that may be relevant to a classification decision. Thus the computer system 130 can provide, as input to a trained machine learning model, one or more input images that excludes background elements (e.g., the belt of the conveyor) and other objects not of interest and instead provides only the regions that are relevant to the classification decision of the model. The bands of information provided may be different from those used for segmentation. The spectral bands that best distinguish a material from other materials may be quite different from the spectral bands that indicate properties of the material or distinguish between different states or variations of that material. Additionally or alternatively, one or more features disclosed herein (e.g., whether a zero-crossing of a first or second derivative of a spectrum is detected at a given frequency band, a function of a convolution of a spectrum (or a derivative or second derivative of the spectrum) and a kernel, the scalar projection of the spectrum onto a particular vector, a number of detected peaks in a spectrum, a number of detected crossings of a given baseline in a derivative of the spectrum, etc.) may be used to characterize the material and/or determine a subsequent action for the object with the material. In some instances, the characterization is performed for each of a set of pixels in a segmented object depiction, and an aggregation of the characterization (e.g., including a mean, mode, median, percentage above a threshold, range, standard deviation, etc.) is used to characterize the object and/or identify a subsequent action for the object. In some instances, the spectra for the set of pixels in the segmented object depiction are first aggregated (e.g., so as to calculate a median, mean, mode, etc.) and then processed to generate a characterization for the object and/or identify a subsequent action for the object.

The segmented hyperspectral image data (and/or features corresponding to the hyperspectral image data) may be processed by trained machine learning models or other computational methods, such as procedural or rules-based models, to look for patterns in the signals related to material signatures, additive or contaminant signatures, or other information indicative of chemical type, composition, morphology, structure, or purity. In materials incorporating multiple different additives, contaminants, or impurities with a main material, such as recycled PET objects of different forms including diverse plasticizers as are often received by a recycling facility, data for multiple region types can be provided. Data for multiple bands of interest can also be provided, including image data for subsets of the spectral bands that exclude those that are less informative due to having similar properties across many forms of recycling feedstock materials. As an example, a classifier implementing an SVM trained to classify materials may be provided with data for certain bands of interest, with segmented regions of different types marked or otherwise indicated.

In some cases, the input provided to a machine learning model can be derived from segmented images, without providing image data itself to the model. Examples include the ratio of a number of pixels classified as one region type to pixels classified as being of another region type (e.g., an amount of pixels showing plastic to pixels showing non-plastics, a ratio of pixels representing PET to pixels representing PE, an amount of pixels for clean PET to an amount of pixels representing contaminated PET), an average intensity (potentially for each of various spectral bands) of pixels segmented to be of a certain region type and a distribution of intensities of pixels segmented as being of a certain region type. The output of any of the machine learning models can be used by the system 130 to control machinery for sorting and processing waste materials. For example, this may be done by labeling an item with metadata indicating a classification, or by generating instructions and sending them to a sorting device to manipulate a particular item in a specified way.

In some embodiments, the waste material that is imaged and analyzed may include, but is not limited to, polymers, plastics, composite materials containing plastics, non-plastics, ligno-cellulosic materials, metal, glass, and/or rareearth materials. The polymeric and plastic materials may include materials formed by one or more polymerization processes and may include highly cross-linked as well as linear polymers. In some cases, the waste material may include additives or contaminants. For example, a plastic material may include a plasticizer, flame retardant materials, impact modifiers, rheology modifiers, or other additives included in the waste material 111, for example, to impart desired properties or facilitate formation properties. In some cases, the waste material may incorporate a constituent chemical or element that may be incompatible with a broad range of chemical recycling processes, and, as such, the characterization data 113 may include information specific to such chemicals. For example, decomposition of halogen or sulfur containing polymers may produce corrosive byproducts that may inhibit or impair chemical recycling of waste materials that include such elements. An example of a waste material containing a halogen constituent is polyvinyl chloride (PVC). Decomposition of PVC, for example, may generate chlorine containing compounds that may act as corrosive byproducts.

FIG. 2 is an example diagram illustrating the segmentation of region types based on the band configuration specified by the profile 153. FIG. 2 provides additional detail, continuing the example of FIG. 1, where a strawberry is the object 101 being imaged, and a profile 153 has already been defined to specify the subsets of bands to be used for segmenting different region types within strawberries. Here, the profile specifies three different composite or synthetic images to create for use in segmentation, labeled as components A, B, and C, each of which is derived from the image data of two or more bands of the hyperspectral image 115. Of course, a profile is not required to specify images that combine multiple bands and may instead in some cases simply specify selected original bands from the hyperspectral image 115 for which image data should be passed on to the segmentation module 160. As directed by the profile 153, the image processing module 140 generates various composite images 220$a$-220$c$ which are then used by the segmentation module to generate masks 230$a$-230$c$ showing segmentation results (e.g., areas or boundaries of areas determined to correspond to different region types). The masks can then be applied to some or all of the images for different bands of the hyperspectral images.

The system 100 takes advantage of the fact that regions with different composition, structure, or other properties can have very different responses to different wavelengths of light. In other words, two different regions of different types (e.g., seeds vs. leaves) may respectively reflect light strongly for different bands. For example, a first band may be mostly absorbed by a first region type (e.g., seeds) while being reflected much more strongly by a second region type (e.g., leaves), making it a good band to use when segmenting the second region type (e.g., leaves). In this example, the different reflectance characteristics, captured in the image data showing intensity values captured for the first band of light, tends to at least partially diminish or remove the regions of the first type, leaving a signal that more strongly corresponds to the second region type. A different band may demonstrate the opposite, with the first region type having a higher reflectance than the second region type. In many instances, however, the level of differential reflectance of two region types is not as stark as illustrated. In particular, the regions of different types may not be able to be distinguished effectively based on only a single spectral band.

The band evaluation module 140 takes as input, the hyperspectral image 115 and uses the profile 153 to determine the band configuration to use for each of the three different region types. For example, the band evaluation module 140 generates three composite images 220$a$-220$c$. The flesh and seeds are shown most prominently by composite image A, generated by (Band 1+Band 3)/(Band 1−Band 3); the seeds of the strawberry are shown most prominently in composite image B (Band 1+Band 3); and the leaves of the strawberry are shown most prominently with band configuration (Band 1−Band 3)/(Band 1/Band 5). In each of these, the reference to the band references the image data for that band, so that, for example, "Band 1+Band 3" represents a sum of the image data for both bands 1 and 3 (e.g., summing the pixel intensity value for each pixel in the Band 1 image with the corresponding pixel intensity value for the image for Band 3). (It will be appreciated that each composite image may instead indicate a value for a feature or a weighted sum of two or more features.) The profile 153 can specify the transformations and aggregations of image data for different bands that best emphasize different region types, or more particularly, emphasize the differences between different region types to make the boundaries more distinct for segmentation.

The segmentation module 160 also receives information from the profile 153, such as an indication of which bands (or features) or combinations of them to use for segmenting different region types, and which other parameters to use for the different region types (e.g., threshold values, which algorithms or models to use, etc.). The segmentation module 160 carries out the segmentation operations and can determine a mask 230$a$-230$c$ for each region type of interest. Each mask for a region type identifies the areas that correspond to that region type (e.g., designates pixels that are classified as depicting that region type). As can be seen in the mask 230$a$, the segmentation process can remove the seeds, leaves, and background leaving the regions where the flesh of the strawberry is shown clearly identified. The masks 230$a$-230$c$ can then each be applied to any or all of the images in the hyperspectral image 115 to generate segmented images, for example, images 240$a$-240$c$ that show the variation in intensity values for the respective bands, but limit the data to image data corresponding to a desired region type.

As discussed above, the segmentation results can be used to evaluate the object 101, such as to determine if the shape, size, proportions, or other properties satisfy predetermined criteria. The segmented regions can also be provided for analysis, including by machine learning models, to determine other properties. For example, having isolated the areas that correspond to a particular region type, the system can limit an analysis process to be performed using areas for that region type. For example, analysis of the chemical composition of the strawberry (e.g., sugar content in degrees Brix or in other units) can be based on the set of pixels identified as corresponding to the flesh of the strawberry, omitting the pixels corresponding to seeds, leaves, or background that would skew the results if considered. Information about the pixels corresponding to the flesh region type for the strawberry, for image data of each of one or more spectral bands of the hyperspectral image 115, be provided to a machine learning model that makes the estimate about the sugar content or other property of the strawberry. Similarly, the segmented data may be used to assess other properties, such as ripeness, overall quality, expected shelf life, etc.

The spectral bands used for segmentation may be different from those used for subsequent analysis. For example, segmentation to distinguish the flesh and seeds may use image data for bands 1 and 2. The segmentation results may then be applied to image data for band 3, which is indicative of a chemical property such as sugar content, and band 4 which is indicative of water content. In general, the approach allows each region type to be segmented using the image data for the band(s) that most accurately distinguish between the region types of interest. Analysis for any properties of interest (e.g., presence or concentration of different chemicals, surface features, structural characteristics, texture, etc.) can benefit from that segmentation, even regardless of the set of bands that best provide image data for the properties to be evaluated.

Figure 3:
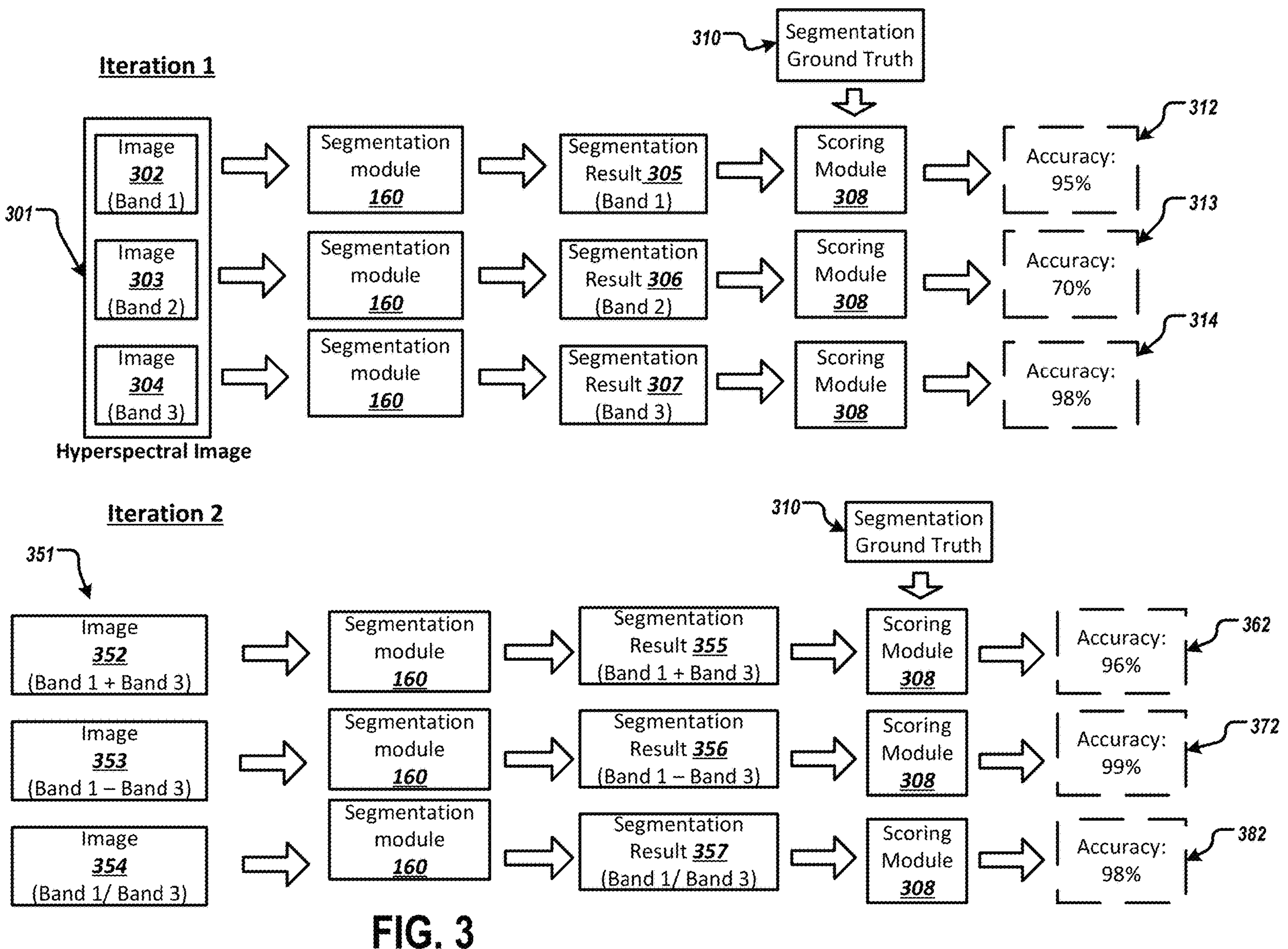
FIG. 3 is a diagram illustrating an example of automatically generating and selecting different bands of image data for performing image segmentation.

FIG. 3 is an example process diagram illustrating an example of iteratively selecting different band configurations to specify for a segmentation profile. As mentioned before, a hyperspectral image includes multiple 2D images, each representing the measured reflectance (or absorptance or absorbance) for a different wavelength band. In some instances, a hyperspectral image may include or may be a hypercube, which includes line scans over each of a set of positions in a two-dimensional image and for each of a set of frequencies. For simplicity, the example of FIG. 3 uses a hyperspectral image 301 with image data for only three bands, band 1, band 2 and band 3, although in many implementations many more bands are used. In addition, the example in FIG. 3 shows analysis for selecting the band configuration to use for a single region type of a single object type. The same process may be performed for each of multiple region types, and for each of various different object types.

In some implementations, in a first iteration of the selection process, the system can assess the image data for each individual band in the source hyperspectral image 301 and determine how well the desired region type can be segmented from that band. For example, each image 302-304 of the hyperspectral image 301 has segmentation applied to generate a segmentation result 305-307. A scoring module compares the segmentation result based on each band's image with the segmentation ground truth for the region and generates a score 312-314 that represents the performance of segmentation for a particular band. For example, the band 1 image 302 of the hyperspectral image 301 is provided as input to the segmentation module 160. The segmentation module 160 performs segmentation and generates the segmentation result 305 based on processing the band 1 image 302. The scoring module 308 compares the segmentation result 305 with the ground truth segmentation 310 and generates a score 312 that indicates an accuracy of 95%. The same process can be done to evaluate each of the other bands in the hyperspectral image 301.

The system then compares the scores 312-314 (e.g., segmentation accuracy scores) for the respective bands to select those that indicate the highest accuracy. For example, a predetermined number of bands can be selected (e.g., the n bands having the highest scores) or a threshold can be applied (e.g., select bands having an accuracy above 80%). The selected bands are then used in a second iteration of the selection process, to evaluate potential combinations of the bands.

For the second selection iteration, the system generates new combinations of bands to test. This can include combining different pairs of the bands selected in the first iteration, using different functions (e.g., sum, difference, product, quotient, maximum, minimum, etc. across a pair of images for different bands). This results in synthetic or composite images, combining selected bands with specific functions as candidates to us in segmentation. For example, during iteration 1, band 1 and band 3 of the hyperspectral image 301 were selected based on these bands having the highest accuracy scores 312 and 332. In the second iteration, the image data for these two bands are combined in different ways to generate new composite or aggregate images. The selected band 1 and band 3 are combined to form the three new images: (1) band 1+band 3, (2) band 1−band 3, and (3) band 1/band 3. The images resulting from these three new band combinations comprise the image collection 351.

The second iteration performs the same steps on the images in the image collection 351 as in iteration 1, e.g., performing segmentation with each image, comparing the segmentation result to the ground truth segmentation 310, generating scores for the accuracy of the segmentations, and comparing the scores, ultimately selecting the subset of images 352-354 from the image collection 351 that provide the best accuracy. For example, during iteration 2, the images in the image collection 351 each undergo the same segmentation and selection process as described for iteration 1. For example, image 352 (formed by adding the image data of band 1 and the image data of band 3) is provided as input to the segmentation module 160. The segmentation module 160 performs segmentation and generates the segmentation result 355 for the band combination (band 1+band 3), segmentation result 356 for the band combination (band 1−band 3), and segmentation result 357 the band combination (band1/band3). The scoring module 308 compares the segmentation results 355, 356, and 357 with the ground truth 310 and generates a score 322 that indicates accuracy of 96%, 99%, and 98% respectively. Segmentation results and scores are determined for each of the other images that were generated with different operators used to combine the data from bands 1 and 3. The system then selects the band configuration(s) that provide the best accuracy of segmentation.

The process can continue for additional iterations, as needed, for example, as long as the maximum accuracy achieved in each iteration increases by at least a threshold amount, until a maximum number of iterations is reached, until a minimum level of accuracy is reached, until candidate band combinations reach a maximum number of operations or bands, or until another condition is reached. The highest-accuracy bands across the various iterations are selected and added to the profile for the region type and object type being evaluated. This can include specifying a subset of the original bands of the hyperspectral image 301 and/or for certain synthetic bands, e.g., sets of bands combined with a certain operator or function.

Figure 4:
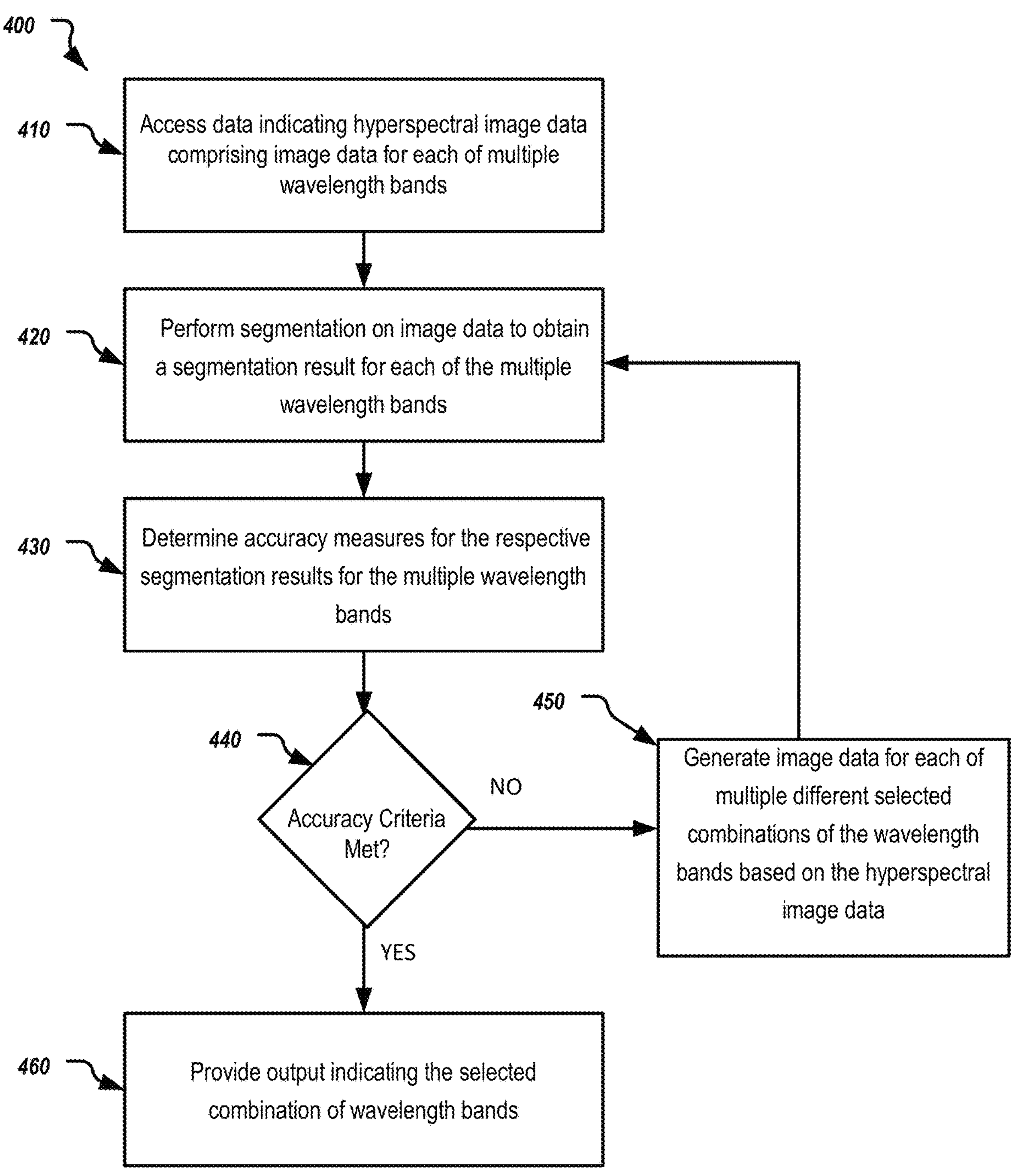
FIG. 4 is a flow diagram describing a process for automatically generating and selecting wavelength bands to use in segmenting images of an object.

FIG. 4 is a flow diagram illustrating an example of a process 400 for band selection and hyperspectral image segmentation. Process 400 is an iterative process where for each of the regions of interest, the process iterates multiple times until a termination criteria is met. During each iteration, the process 400 performs segmentation of the hyperspectral image, selects based on the performance of the segmentation a set of bands, combines the bands within the set of bands to generate new bands, and generates a new hyperspectral image with the new bands. Briefly the process 400 includes accessing hyperspectral image data comprising multiple wavelength bands. Generating image data for each of multiple different combinations of the wavelength bands based on the hyperspectral image data. Performing segmentation for each of the generated sets of image data to obtain a segmentation result for each of the multiple different combinations of wavelength bands. Determining accuracy measures for the respective segmentation results for the multiple different combinations of wavelength bands.

Selecting one of the combinations of wavelength bands based on the accuracy measures. Providing output indicating the selected combination of wavelength bands.

In greater detail, hyperspectral image data comprising multiple images with different wavelength bands is obtained (410). As mentioned before, hyperspectral images have three dimensions, x, y and z where x, y represent the spatial dimension and z represents the number of spectral/wavelength bands. In one interpretation, a hyperspectral image comprises multiple two dimensional images where each two dimensional image is represented by x, y spatial dimension and each of the two dimensional image has a different spectral/wavelength band which is represented by z. Most hyperspectral images have hundreds or maybe thousands of bands depending on the imaging technique. For example, the camera system 110 takes a hyperspectral image 115 of the strawberry 101. The hyperspectral image 115 comprises N images where each of the image has a different wavelength band.

For each of the multiple region types, the process 400 performs segmentation of the hyperspectral image and generates segmentation result (420). As mentioned before, a hyperspectral image comprises multiple images with different wavelength bands. Each image with a particular wavelength band of the hyperspectral image undergoes segmentation. For example, during iteration 1, image 301 includes three images 302, 303, 304 of different wavelength bands that are provided as input to the segmentation module 160. Segmentation of each image with a specific wavelength generates a segmentation result. For example, segmentation of image 302 generates segmentation result 305. Similarly, segmentation of image 303 and 304 generates segmentation result 306 and 307 respectively.

The segmentation result is compared to the ground truth segmentation to generate a performance score (430). For example, the scoring module 308 compares segmentation result 305 of the image 302 to the ground truth segmentation to generate the accuracy of segmentation of image 302 with band 1. Similarly the scoring module 308 compares segmentation result 306 and 307 with the segmentation ground truth 310 to generate accuracy 322 and 332.

The accuracy of segmentation of the hyperspectral image in any of the bands is compared to the desired criteria (440). For example, if the user wants a segmentation accuracy of 99%, but the maximum accuracy of segmentation in the bands for the particular iteration is not equal to or more than 99%, the process 400 performs a selection process from among the bands with maximum accuracy. However, if the maximum accuracy of segmentation in any of the bands meets the desired criteria, the process 400 provides the band as an output (460).

If the segmentation accuracy of the wavelength bands does not meet the desired criteria, the process 400 selects multiple different bands from among the bands with a certain performance score and generates new wavelength bands using the multiple different bands (450). For example, segmentation of the three images 302, 303 and 304 with different bands during iteration 1 generates an accuracy score of 95%, 70% and 98% thereby not meeting the desired criteria of 99%. The process 450 selects band 1 and band 3 based on their high accuracy and generates new bands 352, 353 and 354. These three new bands form a new hyperspectral image 351 in iteration 2.

Figure 5A:
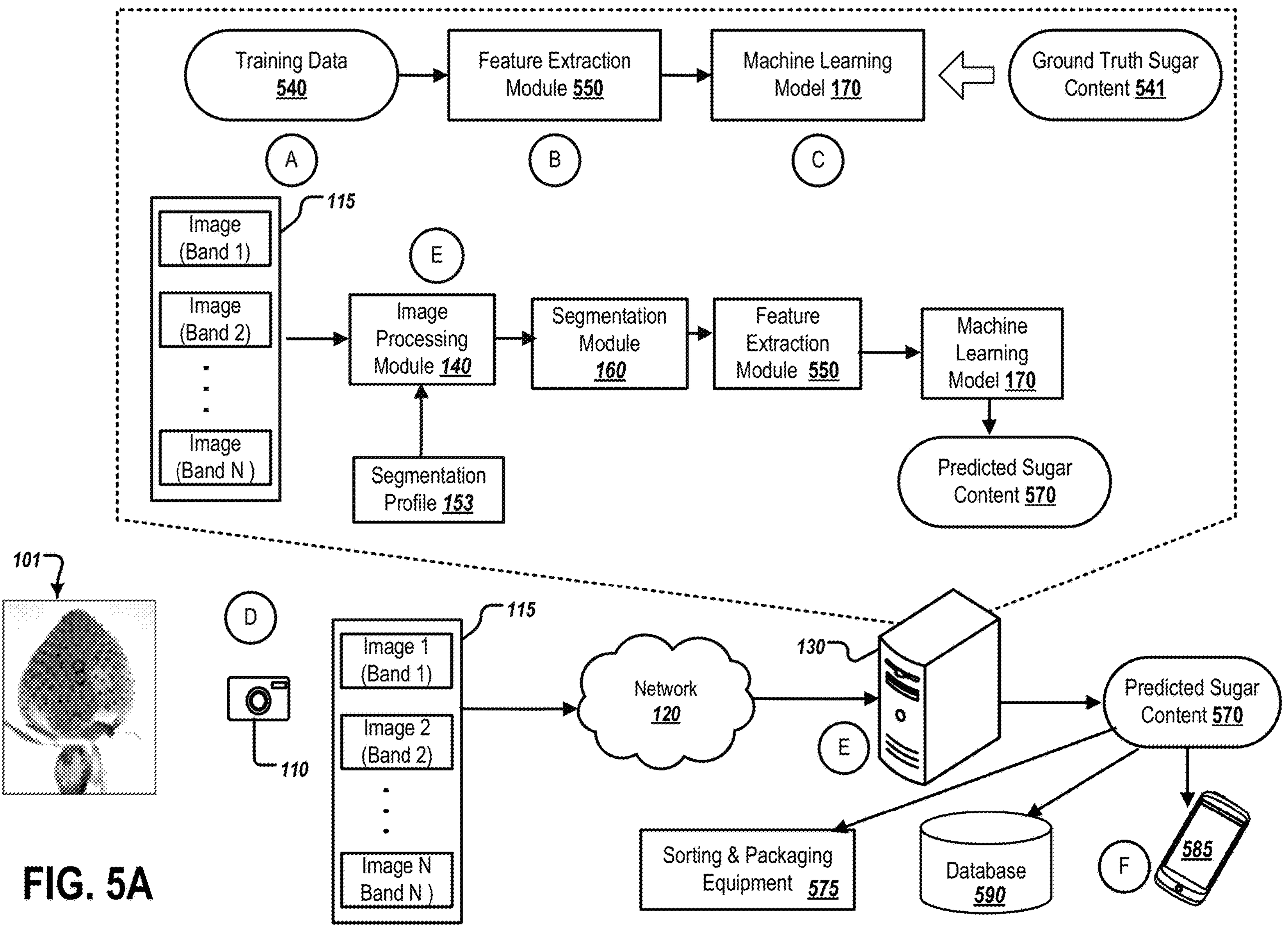
FIGS. 5A-5B are diagrams illustrating examples of a system for predicting the chemical content of an object based on an image of the object.

FIG. 5A is a block diagram of an example system 100 configured to predict the chemical content of an object by processing one or more images of the object using a machine learning model. The system 500 includes a computer system 130 that uses a machine learning model 170 to generate a prediction of a chemical content of a sample 101 based on a hyperspectral image 115 of the sample 101. The system 100 includes a camera system 110 for capturing an image of an object to be analyzed. The camera system 110 can be configured to obtain hyperspectral images, e.g., with pixel intensity values for each of multiple different spectral bands. In some implementations, the camera system 110 can obtain data using other imaging or scanning techniques, including X-ray fluorescence and laser-induced breakdown spectroscopy. The results from spectroscopy or other scanning techniques can be used in addition to or instead of hyperspectral imaging results, for segmentation, model training, predicting amounts and concentrations of chemicals, and so on.

In the example of FIG. 5A and some other examples below, the system 100 uses a model trained to predict sugar content of a particular type of fruit, e.g., strawberries. The same techniques can be used to train models to predict the content of other chemicals in other types of objects. In general, the system 130 can use a machine learning model to process an image of a sample and infer a property for the sample that can only be directly tested through destructive analysis of the sample. Not only does this allow for testing without damaging the sample, it allows for a much faster test and a higher sampling rate for testing in many applications.

As discussed further below for FIG. 5B, the technique can be used to predict properties of a plastic or other material for recycling and waste management. For example, the technique can be used to train models to use information from hyperspectral image data to detect the presence of and predict the concentration of additives to plastics (e.g., phthalates, bromides, chlorates, surface coatings, etc.) and/or contaminants (e.g., oils or food residue on plastic items). In some implementations, the same techniques can be used to train models to predict the type of base resin used (e.g., PE, PET, PVC, etc.) and to predict other properties of an object. The information produced by the models can be used to characterize waste items or a stream of waste material.

One of the ways that the system 100 can provide high accuracy in predicting chemical content is through the use of hyperspectral images that provide much greater levels of information than traditional RGB images. Hyperspectral images can be considered to have three dimensions, with x and y representing spatial dimensions of a pixel grid, and a third z dimension indicating the different hyperspectral bands or wavelengths for which data is captured. In other words, a hyperspectral image can be considered to include multiple two-dimensional images that each represent measured reflectance (or absorptance or absorbance) of a different spectral band or wavelength band which is represented by z. For example, the image 115 comprises multiple images (e.g., image 1, image 2 . . . image N) representing the spatial dimensions where each of the images has a different wavelength band (e.g., Band 1, Band 2 . . . Band N). The image may include or may be a hypercube.

Hyperspectral images often include information for many different spectral bands (e.g., 5, 10, 15, 20, etc.). The bands can also be narrower than RGB bands and may include more than three bands covering the region of spectrum that is covered by RGB data. Hyperspectral images also often include data for spectral bands that are not in the visible range, e.g., bands in the ultraviolet and/or infrared ranges, including potentially one or more bands for each of short-wave infrared (SWIR), mid-range infrared (MWIR), and long-wave infrared (LWIR). Different chemical compounds have different light reflectance and absorption properties for different spectral bands. In other words, different chemicals interact strongly with different wavelength bands depending on their chemical structure. As a result, the ability to assess the reflectance of a sample across many relatively narrow spectral bands using a hyperspectral image can help the system 130 identify the distinct interactions that are characteristic of chemicals of interest. It also helps distinguish between chemicals that have similar properties with respect to some spectral bandwidths but which may have different properties for interaction with other spectral bandwidths.

The set of spectral bands used in analysis of a sample may depend on the nature of the prediction task. For example, the system may identify a subset of spectral bands that are relevant to the analysis of a chemical of interest, and use that subset of spectral bands for training and inference processing. As an example, to assess the sugar content of fruit, images for the spectral band(s) that correspond to the O—H bond vibrational frequency in sugar molecules can be predictive of sugar content. However, a single band for this frequency may not provide the most reliable prediction, and a single band may not appropriately distinguish the interactions of light with sugar from interactions of other compounds that may be present (e.g., water, other carbohydrates, etc.). As a result, when developing the machine learning models, the system 500 can perform various steps to make a data-driven selection of a combination of spectral bands to use in chemical content prediction. The process of testing which bands to use in a model can include creating many different models that are trained to receive input feature values (e.g., an average intensity feature) for each of different sets of spectral bands, and then testing the models to determine which sets of spectral bands perform the best.

In some cases, where properties are known for the chemical about which a prediction is desired, a spectral band or multiple spectral bands may be manually specified to include bands that are known to interact highly with the chemical. For example, for predicting sugar concentration, since sugar molecules have bonds that interact with various spectral bands in the 100 nm to 1000 nm range (and others as well or instead), one or more bands covering this range can be included. Various bands can be used, corresponding to different interaction peaks of chemical compounds of interest for prediction. This can include a band including a primary interaction, as well as secondary, tertiary, or other overtones for stretching or vibration of a chemical bond. In some cases, bands used correspond to different absorption peaks of the chemical across a range. Thus the spectral bands to be used in a model, for training and for inference, can be selected based on chemical structure of a chemical to be predicted and/or known interactions of the chemical with different wavelengths, so that the feature values for those spectral bands directly indicate the effects of the chemical in increasing or decreasing reflectance (or absorptance or absorbance) in those bands. As noted above, other bands can also be chosen to show the effects of other chemicals that, while expected to be present with chemicals of interest, are not actually being predicted. One example is if Chemical A and Chemical B both have similar interactions in a first band, but only Chemical B interacts strongly for a second band (or more generally the relative level or type of interactions are different for the two chemicals in different bands), then even if only the concentration of chemical A is being predicted, features from both bands can be included so the model can learn to attribute or apportion the interactions in the first band among the different chemicals.

In some cases, information in spectral bands directly indicates the presence of a chemical, for example, due to reflectance (or absorptance or absorbance) of that chemical or by differences in reflectance that result from the presence of the chemical. In other cases, the feature data may provide indirect information about the presence of a chemical, through reflectance data indicating chemicals that are not being predicted but nevertheless usually occur together with the chemical of interest. For example, for a given application, two chemicals A and B may typically occur together in a certain ratio, say 60/40. Given the constraints of the application or the chemical properties, it may not be possible to directly measure reflectance in a spectral band that clearly indicates the concentration of Chemical A, which is desired to be predicted. Nevertheless, if there is a spectral band that can indicate the level of concentration of Chemical B, that band can be used in the model. Through machine learning training, the model can learn to predict the concentration of Chemical A using the image data indicating the band that shows the concentration of Chemical B, given the relationship between the two chemicals in the application. The data-driven or experimentally determined selection of which bands are most correlated with and predictive of (e.g., most effective when used in predictive modeling) can reveal these relationships and signal which bands will provide the most accurate and reliable results. This can result from bands that show direct interaction of light with a chemical to be predicted or from bands that show the interactions with other chemicals that are nevertheless related to the chemical of interest and so can serve as a proxy or indicator for the levels of concentration of the chemical of interest.

The selection of spectral bands for use can include generating, assessing, and incorporating augmented bands that may combine information from different spectral bands. For example, many different augmented bands may be created by adding the images for two or more bands, subtracting the image of one band from another, or performing other operations. The system then determines which of the augmented bands have the greatest predictive value for inferring the property or properties of interest. This allows the system to identify, for example, an augmented band that helps isolate the reflectance (or absorptance or absorbance) contribution of the chemical of interest from the contribution of other chemicals. For example, chemicals A and B may both interact strongly with a first band, but only chemical B may interact strongly with a second band. For a model to predict content of chemical A, the system 500 can test many permutations of augmented bands that each add and subtract values for different pairs of spectral bands. The system 100 can determine that an augmented band formed by subtracting the image data for the second band from the image data for the first band is most indicative of the content of chemical A (e.g., since it helps show the interaction with chemical A better than the first band alone). As a result, the system 130 can train a machine learning model to use data for the identified augmented band as input to the model in training of the model and in using the trained model to make inferences about the level of chemical A present in samples.

To provide higher accuracy in predicting chemical content, the system 130 may isolate certain types of regions of an image of a sample that are informative or predict of the chemical content prediction. The system 130 can use the isolated regions of the sample in the image to generate input to the machine learning model, rather than the image as a whole or even the entire portion of the sample shown in an image. This can be done using an automated image segmentation process that identifies regions that meet certain criteria. The segmentation can use data for one or more spectral bands of the hyperspectral image to identify different types of regions of a sample shown in an image. The system 130 can then perform inference processing that treats different types of regions differently, e.g., using only a specific type of region in the image for inferring the level of content of a certain chemical, weighting the values of different regions differently, using different regions for infer the level of content of different chemicals, etc.

In some implementations, the camera system 110 may capture an image of a single side of the sample 101, or may capture images of the sample 101 from multiple different angles, poses, or orientation. As discussed above, the camera system 110 may include cameras capable of capturing images of the fruit in spectrums of light other than the visible spectrum. For example, the camera system 110 can comprise cameras that take images of strawberries in specific bands of infrared and/or ultraviolet light. In the illustrated example, the camera system 110 captures a hyperspectral image 115 of a strawberry.

As discussed further below, the intensity of reflectance in different spectral bands is used in making predictions about chemical content. To provide high accuracy, the images captured and used in training, as well as those used for inference processing, can be captured in controlled conditions. These can include capture under consistent levels of artificial illumination, consistent distances from the light source, capture of images in an enclosure that block ambient light, and so on. This way, the variations in the reflectance (or absorptance or absorbance), as indicated by the differences in pixel intensity values for different spectral bands, can be reliable indicators of differences in chemical content.

The system includes a communication network 120. The network 120 can include a local area network (LAN), a wide area network (WAN), the Internet or a combination thereof. The network 120 can also comprise any type of wired and/or wireless network, satellite networks, cable networks, Wi-Fi networks, mobile communications networks (e.g., 3G, 4G, and so forth) or any combination thereof. The network 120 can utilize communications protocols, including packet-based and/or datagram-based protocols such as internet protocol (IP), transmission control protocol (TCP), user datagram protocol (UDP), or other types of protocols. The network 120 can further include a number of devices that facilitate network communications and/or form a hardware basis for the networks, such as switches, routers, gateways, access points, firewalls, base stations, repeaters or a combination thereof.

The computer system 130 can include one or more computers, which can be located locally or remotely with respect to the camera system 110 and sample 101. The computer system 130 can be a server system that receives image data from a remote client, potentially with a request to determine chemical content of a particular chemical. The computer system 130 can process the image data with a trained machine learning model 170 to generate a prediction of an amount or concentration of the particular chemical, and then provide data indicating the prediction to a device, e.g., for storage in a database, for output in a user interface, to control a sorting system or packaging system, etc.

One application of the technology that is illustrated in FIG. 5A is using the computer system 130 to train and use a machine learning model 170 for predicting (e.g., inferring) the sugar content of fruit. The machine learning model 170 can be trained to infer an amount or concentration of a specific chemical or of a group or class of chemicals. Similarly, the model 170 can be trained to make the inference for a specific type of fruit, e.g., strawberries. Different models can be trained to predict content of different chemicals in different sample types (e.g., for different types of fruit). In FIG. 1, the model 170 is used to infer sugar content in fruit juice of a strawberry based on a hyperspectral image of the exterior of a whole strawberry. The camera system 110 captures an hyperspectral image 115 of the sample 101 and transmits the data for the image 115 to the computer system 130 using the network 120. Upon receiving the image captured by the camera system 110, the computer system 130 processes the image 115 using the trained machine learning model 170 to predict the sugar content of the fruit within the image as a value in degrees Brix.

In some implementations, the components of the system 500 can be geographically distributed. In such implementations, the computer system 130 can be implemented by a single remote server or by a group of multiple different servers that are distributed locally or globally. In such implementations, the functions performed by the computer system 130 can be performed by multiple distributed computer systems and the prediction model is provided as a software service over the network 120. In some implementations, the system 500 can be implemented locally. For example, the system 500 can be implemented as a stand-alone sensor unit that houses the camera system 110 and the computer system 130.

Although model training may take place in a remote system, the trained model 170 can then be distributed to different client devices over the network 120 and then the client devices can process locally-captured images with the locally-stored model 170. In such implementations, the user can point the camera of the user device and take images of a particular type of object. In such implementations, the machine learning model 170 can be stored on and used by the user device to generate chemical content inferences.

The machine learning model can also be provided as a software service accessed by a user device. For example, the machine learning model can be implemented on a remote server. Upon taking an image of the fruit in the scene using the user device, such as a smartphone, the user can send the image over the network 120 by uploading it to the remote server. Upon receiving the image, the remote server processes the image to predict the sugar content of the fruit in the image. The predicted sugar content is then sent to the user device via the network 120 for display or notify the user. Such implementations can be based on third party applications executing in the operating system of the user device or they can be implemented by accessing the remote server website or portal connected by the network 120 or the Internet.

FIG. 5A further illustrates an example flow of data, shown in stages (A) to (F). Stages (A) to (F) may occur in the illustrated sequence, or they may occur in a sequence that is different than in the illustrated sequence. In some implementations, one or more of the stages (A) to (F) may occur offline, where the computer system 130 may perform computations when the user device is not connected to the network 120. Stages (A) to (C) describe training the machine learning model 170, and stages (D) to (F) describe using the trained model 170.

During stage (A), the computer system 130 obtains a set of training images 540. The set of training images 540 comprises a plurality of images of a particular type of fruit. For example, to predict the sugar content of strawberries, the set of training images 540 will include multiple images of different strawberries, including examples of strawberries having different levels of sugar content. Each image in the set of training images 540 is associated with a ground truth label 541 indicating the actual sugar content of the strawberry, as determined through measurement of the sugar content. The ground truth label 541 of the fruit can be obtained by first capturing an image of the fruit and then performing an invasive and/or destructive chemical test to determine the sugar content of the fruit. Typically, the measurement is done through destructive testing, such as crushing the strawberry after the image has been captured and measuring the sugar content of the released juice in degrees brix, e.g., using a refractometer or a hydrometer.

In some implementations, the set of training images 540 may comprise two or more images that may correspond to a same particular fruit, where each of the two or more images is taken in a different light spectrum, angle, distance, pose or the camera system. For example, the set of training images 540 may include two images where the first image depicts one side of a strawberry and the second image shows the other side of the same strawberry. In such an example scenario, both the images will have the same ground truth sugar content since the images refer to the same fruit.

To allow for training of a robust model, the training images 540 can include images of strawberries taken with different camera systems, different illumination levels, different distances of camera to subject, different orientations or poses of samples, and so on.

During stage (B), the computer system 130 uses a feature extraction module 550 to process images and generate input features to provide to the machine learning model 170. (It will be appreciated that, in some instances, feature extraction module 550 and machine learning model 170*b* may operate as a single same model. For instance, one feature may be an image itself.) The processing of an image can include several steps. The system 130 segments the training image into regions of different types. (It will be appreciated that, in some instances, segmentation is performed, such that segmentation profile 153 may be a null operation. Additionally or alternatively, image processing—such as segmentation—may be performed as part of a pipeline within the machine-learning framework.) The different types can correspond to different parts of the type of object the model 170 is being trained to analyze. For example, different region types can be determined for the flesh of a strawberry, seeds of a strawberry, and the leaves or calyx of the strawberry. Another type of region can refer to background pixels that show the environment or surroundings of the sample 101 but not the sample 101 itself. In the example, images used for training are segmented and the regions corresponding to the flesh of the strawberry are used for determining feature values, while other regions are discarded and not used for the analysis of sugar content. For example, the outer surface of a strawberry generally comprises both the flesh and the seeds. In such an example, the feature extraction module 550 can process images in the set of training images 540 to perform image segmentation by separating the image regions representing the flesh part of the fruit from the seeds.

The feature extraction module 550 can also determine the values of various different features. These features can be the average pixel intensity in the selected, segmented regions of the training image for each of different spectral bands. For example, an average intensity for band 1 can be provided, an average intensity for band 2 can be provided, and so on. The average intensity values for a selected set of spectral bands can be used as an input vector for input to the machine learning model 170 during training.

As an alternative to segmentation to isolate portions of an object used for chemical prediction and portions of the object that are not used, the system 130 can use a sampling technique instead. For example, with a strawberry, the areas with seeds and the areas without seeds have very different reflectance curves across the hyperspectral bands. In particular, the seeds are generally more reflective for most if not all spectral bands. To take advantage of this property, the feature extraction module 150 can take small samples of image data across the region of the image showing the strawberry, and determine the reflectance curves or reflectance average values in each of the small sampled areas. The sampling within the area showing the strawberry may be done randomly or pseudo-randomly, with a regular or grid-like pattern, or even using sampling to cover the entire area of the strawberry. The reflectance results for each sample area, whether as curves, vectors of averages for bands, etc., are then clustered together into clusters. In this application, there will be two main clusters, one having overall higher reflectance representing the inclusion of a seed, and another with lower reflectance where the sample avoided a seed. The values in the cluster with lower reflectance can then be selected as the group to use to generate feature values for training, and the same technique can be used to determine the feature values for inference processing. This technique uses sampling to isolate the contribution of the particular type of region of interest (e.g., strawberry flesh) from the contribution of other regions (e.g., showing seeds) that would otherwise cause inaccuracy in the predictions.

In some implementations, the computer system 130 can perform analysis to determine which spectral bands are most effective to predict the type of property the model 170 is being trained to predict. For example, prior to the training in step (B), the computer system 130 can perform an analysis process to examine the predictive value of different spectral bands individually or collectively to determine a combination of bands that provides the greatest accuracy of prediction for predicting the chemical content of a particular chemical from a particular type of sample (e.g., type of object). This allows dimensionality reduction and smaller models while often improving accuracy. In general, hyperspectral images have dozens of bands depending on the imaging technique used to capture the image, and not all of the bands provide useful information for predicting the chemical content for a desired chemical. The system can select a subset of bands, including potentially augmented (and synthetic) bands that combine data from different bands together, that provide information about desired types of chemical content to be predicted, based on the correlation or predictive value identified through analysis of example data.

During stage (C) the computer system 130 uses the feature values determined from training images to train the machine learning model 170. In some implementations, the model 170 is a decision tree, such as a gradient boosted regression tree (e.g., an XG boost tree). In other implementations, the model 170 may be a neural network, a support vector regression model, or another type of model. The machine learning model 170 includes a plurality of parameters that have values that are adjusted during training. Training the machine learning model involves adjusting the trainable parameters of the machine learning model so that the machine learning model 170 can predict the level of content of one or more chemicals by processing the set of input feature values, e.g., an average intensity value for each of a predetermined set of spectral bands, determined from the selected segmented areas of the training image. When a gradient boosted decision tree is used as the model type, a gradient boost training algorithm can be used. In other implementations, a neural network may be used, and backpropagation of error and other neural network training techniques can be used.

Training can proceed with different training examples until the model 170 can predict the desired property or properties, e.g., an amount or concentration of a compound from the input. In the case of analyzing sugar content of strawberries, with an appropriate set of training data and sufficient iterations, the model 170 can be trained to predict sugar content in degrees Brix at an accuracy that matches or exceeds the level provided by typical destructive testing.

After the model is trained, the model 170 can be used to make predictions for objects based on images of the objects. During stage (D), the camera system 110 captures an image 115 of the sample 101, which is a strawberry, the type of object for which the model 170 has been trained to make chemical content predictions. The camera system 110 can capture a hyperspectral image 115 that includes image data for spectral bands outside the visible spectrum in addition to or instead of for spectral bands in the visible range. For example, the camera system 110 captures the hyperspectral image 115 of the sample 101. The image 115 includes multiple images (e.g., image 1, image 2 . . . image N) representing the spatial dimensions where each of the images has a different wavelength and/or band (e.g., Band 1, Band 2 . . . Band N). The camera system 130 provides the image data for the image 115 to the computer system 130 over the network 120.

During stage (E), the computer system 130 receives the image 115 via the network 120 and processes the data using the machine learning model 170 to determine a predicted level of chemical content. In this example, upon receiving the image 115, the computer system 130 processes the image 115 to predict the sugar content of the strawberry shown in the image 115.

The feature extraction module 550 processes the image 115, including segmenting the image to identify portions of the image 115 that represent the sample 101 (e.g., the strawberry rather than background), and more specifically to identify portions of the image 115 that show a particular type of region of the strawberry (e.g., the flesh of the strawberry, as opposed to leaves, seeds, etc.). Using the selected subset of segmented regions, e.g., the regions of the image 115 identified as the flesh of the strawberry, the module 550 determines values for each of a predetermined set of features. The features can correspond to different spectral bands that have been selected for use in predicting the chemical property or properties of interest. For example, the features may be average intensity for each of a subset of spectral bands in the image 115. As a result, a set of feature values is determined for the image 115, with each feature value representing an average intensity value for a different spectral band (which may be an augmented band) in a predetermined set of spectral bands, where the averages are determined over the segmented regions identified as the flesh of the strawberry. The predetermined set of spectral bands can be the same set of spectral bands for which information was provided to the model 170 during training.

The feature values generated by the feature extraction module 550 are provided as input to the trained machine learning model 170. The machine learning model 170 processes the input feature values using the training state determined during training, e.g., using the parameter values as set in stage (C) discussed above. The model 170 produces an output 570 that indicates the predicted (e.g., inferred) level of content of one or more chemicals that the model 170 has been trained to predict. For example, the model 170 can provide a regression output (e.g., a numerical value) that indicates sugar content of the strawberry that is depicted in the image 115. The output 570 can be expressed in any appropriate form or type of unit, such as degrees Brix, degrees Plato, specific gravity of sugar, mass fraction of sugar, or concentration of sugar. The type of measurement used in the prediction can be the same type used for the ground truth labels 541 used in the training of the model 170.

During stage (F), data indicating the predicted chemical content 570 is provided to a device. For example, the prediction 570 can be stored in a database 590 or other data storage, in association with a sample identifier, time stamp, and potentially context data such as a sample type, location, etc. As another example, the prediction 570 can be provided to a user device 585, such as a smartphone, laptop computer, desktop computer, etc., for presentation to a user in a user interface.

In some implementations, the predicted chemical content is assessed by the computer system 130 or another device. For example, the chemical content prediction 570 can be compared with one or more thresholds, and a user can be presented an alert if the chemical content is above a maximum level, below a minimum level, inside a range, outside a range, or satisfies another predetermined condition. The prediction 570 can be used by the computer system 130 or another system to control sorting or packaging equipment 575 that is configured to move strawberries having different sugar levels to different areas or containers. The prediction 570 may additionally or alternatively be used to assign a label or tag to the sample 101 or to a source of the sample 101 (e.g., a lot or batch that includes the sample 101; a particular plant, group of plants, or field in which the sample 101 is located or was taken from; etc.). This functionality can be used to estimate or optimize a time to harvest strawberries or other fruits in a fine-grained manner, to achieve desired levels of chemical content (e.g., sugar concentration or other properties).

While the techniques above are shown with an example of predicting sugar content of a sample 101 in degrees Brix, the same techniques can be used to predict concentrations of other chemicals. More generally, the techniques can be used to predict other properties such as texture, firmness or softness, time until predicted ideal harvesting time, etc. These and other properties may be predicted by training a model using ground truth values for the type of property to be predicted. These other properties may be related to or correlated with chemical content in some cases (e.g., time to harvest may be based in part on sugar concentration), or may not be in other cases.

Figure 5B:
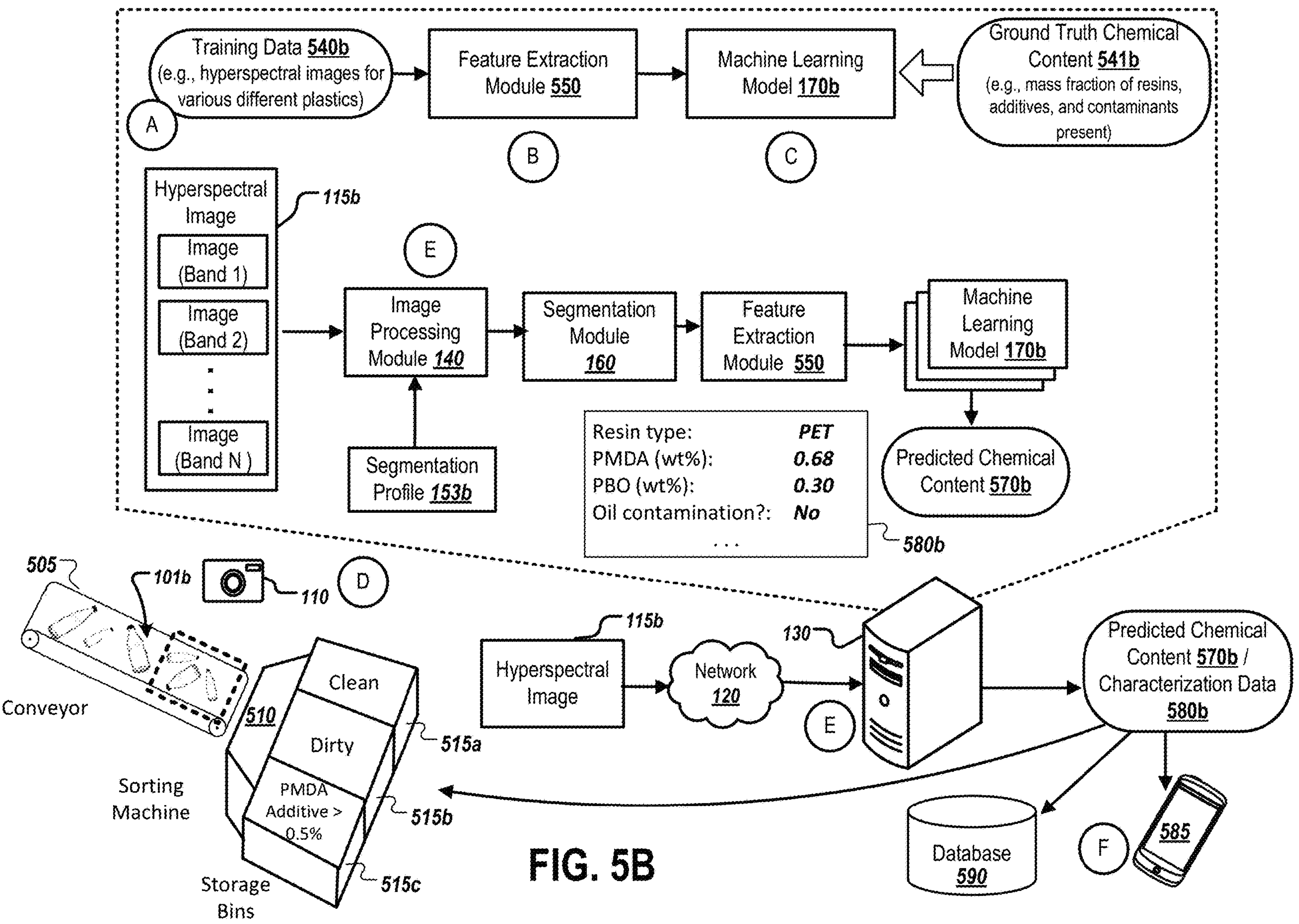

FIG. 5B is a block diagram showing another example of the system 100 predicting chemical content based on one or more images using a machine learning model. The system 100 can perform segmentation of image data and use the machine learning model to predict chemical content. Both the segmentation process and the chemical content prediction process can be tuned by selecting a subset of the available bands of information from the hyperspectral image and/or by defining select features to characterize objects and/or materials depicted in the hyperspectral image. As a result, the system 100 can use different bands of information and/or different kinds of information to segment or identify regions in the hyperspectral image corresponding to different objects or materials. Similarly, the system can use different bands of information as input to estimate different chemical properties or to estimate the properties of different types of objects. This selective use of information from the hyperspectral image can provide higher accuracy in predictions as well as faster, less-computationally intense models.

The example of FIG. 5B shows prediction properties of a plastic or other material for recycling and waste management. For example, the technique can be used to train models to use information from hyperspectral image data to detect the presence of and predict the concentration of additives to plastics (e.g., phthalates, bromides, chlorates, surface coatings, etc.) and contaminants (e.g., oils or food residue on plastic items). In some implementations, the same techniques can be used to train models to predict the type of base resin used (e.g., PE, PET, PVC, etc.) and to predict other properties of an object. The information produced by the models can be used to characterize waste items or a stream of waste material.

The system 100 can perform optical sorting using hyperspectral imaging to separate recyclable plastics from other materials, as well as to sort plastics by resin type, by level or type of contamination, and/or by presence or concentration of additives. The system 100 includes a conveyor 505 that conveys a waste stream 101*b* that includes various plastic items. The camera system 110 captures a hyperspectral image 115*b* of items in the waste stream 101*b* while on the conveyor 505. The hyperspectral images may have been generated using an optical system that includes one or more light sources and one or more cameras (and/or one or more light sensors). The light source(s) may be configured to emit (for example) infrared light, near-infrared light, shortwave light, coherent light, etc. In some instances, the light source(s) include fiberoptics, which can (for example) separate an output of the light source is separated from a heat output. In some instances, at least one of the camera(s) is positioned such that an optical axis of a lens or image sensor of the camera is between 75-105 degrees, 80-90 degrees, 85-95 degrees, 87.5-92.5 degrees, 30-60 degrees, 35-55 degrees, 40-50 degrees, 42.5-47.5 degrees, or less than 15 degrees relative to a surface supporting the object(s) being imaged (e.g., a conveyor belt). In some instances, the optical system includes multiple cameras, where an angle between an optical axis of a first camera relative to a surface supporting the object(s) is different than an angle between an optical axis of a second camera relative to the surface. The difference may be (for example) at least 5 degrees, at least 10 degrees, at least 15 degrees, at least 20 degrees, at least 30 degrees, less than 30 degrees, less than 20 degrees, less than 15 degrees, and/or less than 10 degrees. In some instances, a first camera filters for a different type of light relative to a second camera. For example, a first camera may be an infrared camera, and a second camera may be a visible-light camera. In some instances, a camera is tilted at a first angle relative to a surface supporting the object(s) being imaged and a light source is tilted at a second angle relative to the surface. The first angle may be (for example) approximately the opposite of the second angle. To illustrate, the camera may be tilted at 5 degrees to the normal vector of the belt, and the optical axis of the illumination may be tilted at −5 degrees to the belt normal.

Based on processing of the hyperspectral image 115*b*, the system 100 sorts items in the waste stream 101*b* into different bins 515*a*-515*c*. For example, a sorting machine 510 can be operated based on the processing of the hyperspectral image 115*b* to sort plastics into bins such as for clean PET items (bin 515*a*), for dirty or contaminated PET items (bin 515*b*), and for PET items having an additive above a predetermined concentration (bin 515*c*). Of course, instead of storing items in bins, the sorted output streams may optionally be sent on different conveyors to be directly processed through chemical or mechanical recycling. As the waste stream 101*b* is conveyed, hyperspectral images of different portions of the stream are taken and processed, so individual items (e.g., bottles, containers, etc.) can each have their composition analyzed and individual items can be sorted based on the resins, contaminants, and additives determined to be present, as well as potentially the amounts and concentrations estimated for each chemical of interest.

In some implementations, the camera system 110 can use other imaging or scanning techniques, such as X-ray fluorescence and laser-induced breakdown spectroscopy, in addition to or instead of hyperspectral imaging. The camera system 110 can include scanning equipment positioned to acquire scans of objects in the waste stream 101*b* on the conveyor 505. The conveyor 505 can be configured to carry objects to positions where scanning occurs, and then periodically stop so that scans of different items or groups of items on the conveyor 505 are acquired. Scans for hyperspectral imaging and spectrographic techniques can be taken from the same scanning location on the conveyor 505 or at different positions on the conveyor 505.

In plastics, some chemical properties of interest are uniformly distributed through the material. For example, it is common for the resin type and additive concentration to be uniform throughout a plastic item. However, contaminants, labels, occluding objects, and other elements may obscure or interfere with hyperspectral measurement of portions of a plastic item. Similarly, some elements such as lids may be of a different material or composition as the corresponding container. Segmentation of the hyperspectral image data can be performed to separate plastic items from non-plastic items and to separate individual plastic items from each other. In addition, segmentation can be performed to identify regions of an item that are contaminated from those that are not. This allows the image data for the contaminated region to be isolated and used to provide input to models that predict contaminant type and concentration. The regions identified as being uncontaminated can be used to provide input to models that predict resin type and additive properties. As a result, by using different segmented regions for different models, the system 100 can obtain greater accuracy than assessing properties of an object based on the full region of image data representing the object.

FIG. 5B further illustrates an example flow of data, shown in stages (A) to (F). Stages (A) to (F) may occur in the illustrated sequence, or they may occur in a sequence that is different than in the illustrated sequence. Stages (A) to (C) describe training of one or more machine learning models 170*b* to predict chemical properties. Stages (D) to (F) describe using the one or more trained models 170*b*, including performing segmentation to determine which regions of the hyperspectral image 115*b* are relevant to the parameters that the model(s) 170*b* predict.

During stage (A), the computer system 130 obtains a set of training images 540*b*. The set of training images 540*b* comprises images of the plastics or other recyclable items to be analyzed. For example, to predict the resin type, additives, and contamination of plastic items, the set of training images 540*b* can include multiple hyperspectral images of different types of plastics, as well as example hyperspectral images of plastics having different additives and different types of contamination. The examples with additives and contaminants can include examples with different concentrations and different combinations, as well as examples for each of multiple different base resin types. Each hyperspectral image in the set of training images 540*b* can be associated with a ground truth label 541*b* indicating the actual properties of the item imaged. For example, the ground truth labels 541*b* can include information for any of the properties that the models 170*b* will be trained to predict, such as resin type, whether different additives or contaminants are present, the amount or concentration of each of different additives or contaminants, and so on. In some implementations, the ground truth labels 541*b* can indicate a mass fraction or other measure of resins, additives, and contaminants present. The information in the ground truth labels 541*b* can be determined through testing of the samples imaged, or by looking up characteristics of the materials from manufacturing data or reference data for the types of objects imaged. To allow for training of a robust model, the training images 540 can include images of a fruit of a given type, waste products, etc., taken with different camera systems, different illumination levels, different distances of camera to subject, different orientations or poses of samples, and so on.

During stage (B), the computer system 130 uses a feature extraction module 550 to process hyperspectral images and generate input features to provide to the machine learning models 170*b*. The processing of a hyperspectral image can include several steps. The system 130 segments the training image into regions of different types. The different types can correspond to different parts of the type of object the model 170*b* is being trained to analyze. For example, different region types can be determined for regions of different base resin types, or areas of contamination and areas that are not contaminated. Another type of region can refer to background pixels that show the environment or surroundings of the sample 101*b* but not the sample 101*b* itself. In the example, images used for training are segmented, and the regions corresponding to a non-contaminated area are used for determining feature values for predicting resin content and additive properties, while contaminated regions are used to generate feature values for predicting the type and concentration of contaminants.

The feature extraction module 550 can also determine the values of various different features. These features can include the average pixel intensity in the selected, segmented regions of the training image for each of different spectral bands. For example, an average intensity for band 1 can be provided, an average intensity for band 2 can be provided, and so on. The average intensity values for a selected set of spectral bands can be used as an input vector for input to the machine learning model 170*b* during training. Other exemplary features are disclosed herein, such as whether a zero- or baseline-crossing is detected in a given frequency band in a derivative or second derivative of the spectrum (e.g., with the derivative being taken across frequencies), a number of detected peaks, an integral of a convolution (or a derivative or second derivative of the spectrum) of the spectrum and a kernel, etc.

Different models 170*b* can be generated and trained to predict different properties. For example, five different classifiers may be trained for five different base resins, each being trained to predict the likelihood that an image region shows the corresponding base resin. Similarly, ten different models can be trained to each predict the concentration of one of ten different additives. As another example, to characterize the content of three different contaminants, three different contaminant models can be generated, one for each contaminant type of interest. In some cases, models can be even more specialized, such as a first set of models trained to predict concentration of different additives in PET samples, a second set of models trained to predict concentration of different additives in PE samples, and so on. Each of the different chemicals to be detected and measured can have different responses to the various spectral bands of a hyperspectral image. As a result, the various models 170*b* to predict different chemical properties may be configured and trained to use input data of different subsets of the spectral bands of the hyperspectral image. The bands used for each model 170*b* can be selected to best identify the property of interest and, in some cases, to best distinguish from the presence of other materials that are frequently present.

In some implementations, the computer system 130 can perform analysis to predict which spectral bands and/or features are most effective, sufficiently effective, or relatively effective to predict the type of property each model 170*b* is being trained to predict. For example, prior to the training in step (B), the computer system 130 can perform an analysis process to examine the predictive value of different spectral bands individually or collectively to determine a combination of bands that provides the greatest accuracy of prediction for predicting the chemical content of a particular chemical (e.g., a particular resin, additive, or contaminant). This allows dimensionality reduction and smaller models while often improving accuracy. In general, hyperspectral images have dozens of bands depending on the imaging technique used to capture the image, and not all of the bands provide useful information for predicting the chemical content for a desired chemical. The system can select a subset of bands, including potentially augmented or synthetic bands that combine data from different bands together, that provide information about desired types of chemical content to be predicted, based on the correlation or predictive value identified through analysis of example data.

The bands or combinations of bands that facilitate high accuracy for each chemical property to be predicted can be identified by the system 130 through a process analogous to the one described herein (e.g., in FIG. 3) for determining the bands to use for segmenting different types of region. For example, various different models (e.g., a set of regression trees, support vector machines, etc.) can be trained based on data from different individual bands, and the performance of the different models can be tested and compared. The models having the highest accuracy are identified, and then new models are trained in another iteration, where the new models use different pairs of the bands that resulted in the most accurate models in the first set. For example, if there are 20 spectral bands in the hyperspectral images, the first iteration can train 20 models to each predict the concentration of the same plastic additive using data for a single one of the spectral bands. Then, the bands respectively used by the highest-accuracy subset of the models (e.g., the top n models where n is an integer, or the set of models that provide accuracy above a threshold) are identified. If five bands are selected as most related to the plastic additive, then the next evaluation iteration can train another 10 models to predict the concentration of the same plastic additive, each one using a different pair of the five selected bands from the previous iteration. Optionally, the five bands can be combined in different ways to generate augmented or synthetic bands which can be additionally or alternatively used to train and test models. The iterations can continue until at least a minimum level of accuracy is reached or until performance fails to increase by more than a threshold amount. This same overall technique can be used to assess which other different spectroscopic techniques, e.g., X-ray fluorescence, laser-induced breakdown spectroscopy, etc., or which portions of the results of these techniques, are most predictive of different chemical properties. It will be appreciated that this type of iterative approach may instead or additionally be performed to select features (e.g., from among multiple types of features and/or features corresponding to multiple frequency bands) to use to predict which chemicals are in a depicted object, chemical properties, etc.

Other techniques can be used to select the subsets of bands used to train different models 170*b*. For example, the computer system 130 can access data describing reference hyperspectral data showing the response for pure or high-concentration samples, and the system can identify the bands that have high and low intensity that respectively show the bands that are most and least affected by the presence of the plastic additive. As another example, hyperspectral images for different known concentrations of a chemical can be compared to identify which bands vary the most as concentration changes, thus indicating which bands are most sensitive to changes in concentration.

During stage (C) the computer system 130 uses the feature values determined from training images to train the machine learning models 170*b*. In some implementations, the models 170*b* are decision trees, such as gradient boosted regression trees (e.g., XG boost trees). In other implementations, each model 170*b* may be a neural network, a support vector regression model, or another type of model. Each machine learning model 170*b* includes a plurality of parameters that have values that are adjusted during training. Training the machine learning model involves adjusting the trainable parameters of the machine learning model so that the machine learning model 170*b* can predict the level of content of one or more chemicals by processing the set of input feature values, e.g., an average intensity value for each of a predetermined set of spectral bands selected for that model 170*b*. The input values can be determined from the selected segmented areas of the training image that are relevant to the chemical being characterized (e.g., areas segmented as contaminated used to generated input for the contaminant characterization models 170*b*). When a gradient boosted decision tree is used as the model type, a gradient boost training algorithm can be used. In other implementations, a neural network may be used, and backpropagation of error and other neural network training techniques can be used.

Training can proceed with different training examples until the models 170*b* can predict the desired property or properties, e.g., an amount or concentration of a compound. In the case of analyzing plastics, with an appropriate set of training data and sufficient iterations, the model 170*b* can be trained to predict a mass fraction of each of different additives at an accuracy that matches or exceeds the level provided by typical destructive testing. Similarly, the models 170 can be trained to predict the resin types present and whether different contaminants are present and the amounts or concentrations present.

After the models 170*b* are trained, the models 170*b* can be used to make predictions for objects based on images of the objects. During stage (D), the camera system 110 captures an hyperspectral image 115*b* of the sample 101*b*, which is an image of a region 520 on the conveyor 505 that shows one or more objects to be sorted. The hyperspectral image 115*b* includes image data for spectral bands outside the visible spectrum in addition to or instead of for spectral bands in the visible range. For example, the camera system 110 captures the hyperspectral image 115*b* of the sample 101*b*. The image 115*b* includes multiple images (e.g., image 1, image 2 . . . image N) representing the spatial dimensions where each of the images has a different wavelength and/or band (e.g., Band 1, Band 2 . . . Band N). When appropriate, the camera system 110 can also acquire scan results for X-ray fluorescence spectroscopy, laser-induced breakdown spectroscopy, Raman spectroscopy, or other spectroscopic techniques, which can provide additional bands of data about the objects on the conveyor 505. The camera system 130 provides the image data for the image 115*b*, as well as any other related spectroscopic results, to the computer system 130 over the network 120.

During stage (E), the computer system 130 receives the image 115*b* via the network 120 (or directly over a wired or wireless connection) and processes the data using the machine learning models 170*b* to determine chemical properties of one or more objects in the region 520. This can include detecting the presence of different chemicals and estimating the level of chemical content present for each of multiple different chemicals. When the region 520 shows different items (e.g., different bottles in this example), the processing can be done for each item individually, to characterize the chemical content of each and sort each item appropriately. In this example, upon receiving the image 115*b*, the computer system 130 processes the image 115*b* to predict the resin type, additives present, and contaminants present, and also the concentrations of each of these compounds, for each plastic object identified from the in the image 115*b*.

The feature extraction module 550 processes the image 115*b*, including segmenting the image to identify portions of the image 115*b* that represent the different objects in the sample 101*b* (e.g., the different bottles rather than background), and more specifically to identify portions of the image 115*b* that show a particular type of region (e.g., a region of PET vs PE; a contaminated region vs. a clean region, etc.). Using the selected subset of segmented regions, the module 550 determines values for each of a predetermined set of features. The features can correspond to different spectral bands that have been selected for use in predicting the chemical property or properties of interest. In other words, data for different combinations of bands can be used to provide input to different models 170*b*. In addition, the data for those bands can be taken from the specific segmented region(s) relevant to the model, e.g., using segmented regions of contamination only to generate input features for the models trained to predict contaminant concentration. For example, the features may be average intensity for each of a subset of spectral bands in the image 115*b*. When data for other spectroscopic techniques is obtained, feature values for these spectroscopic results can also be generated and provided as input to the models 170*b* to generate estimates of chemical content. As a result, a set of feature values is determined for the image 115*b*, with each feature value representing an average intensity value for a different spectral band (which may be an augmented band) in a predetermined set of spectral bands, where the averages are determined over the segmented regions identified as the region type corresponding to the model. The predetermined set of spectral bands can be the same set of spectral bands for which information was provided to the respective models 170*b* during training.

The feature values generated by the feature extraction module 550 are provided as input to the trained machine learning models 170*b*. As noted above, those can be different sets of feature values for each model 170*b*, determined based on the subset of bands selected as most related to or most effective for predicting the property the model 170*b* predicts. The machine learning models 170*b* process the input feature values using the training state determined during training, e.g., using the parameter values as set in stage (C) discussed above. The models 170*b* can each produce an output 570*b* that indicates a predicted (e.g., inferred or estimated) level of content of one or more chemicals that the model 170*b* has been trained to predict. For example, different models 170*b* can each provide a regression output (e.g., a numerical value) that indicates mass fraction of a different additive. The type of measurement used in the prediction can be the same type used for the ground truth labels 541*b* used in the training of the model 170*b*.

In the example, the segmentation results and model outputs are combined to characterize an object. For example, characterization data 580*b* for one object indicates that the object is formed of PET, that an additive PMDA is present with a mass fraction of 0.68, an additive PBO is present with a mass fraction of 0.30, and that the object is not contaminated with oil. Each of these elements can be predicted using a different model 170*b* that uses a corresponding set of bands of information. Some features, such as the resin type and whether contamination is present, can be determined based on the segmentation results, which in this example can segment the object as a PET object and show that there are no contaminated regions. In some implementations, based on the base resin type identified through segmentation or output of models 170*b*, the system 130 can select which models 170*b* to use to detect different additives and contaminants. For example, one set of models can be trained to detect additives in the presence of PET, while other sets of models can be trained to detect the same or different additives in other resin types. This can enable each model to more accurately focus on the spectral features that distinguish each additive from the different resin types, which may result in higher accuracy concentration results than a general model for multiple resin types.

During stage (F), data indicating the characterization data 580*b* is provided to a device. For example, the data 580*b* can be stored in a database 590 or other data storage, in association with a sample identifier, time stamp, and potentially context data such as a sample type, location, etc. As a result, individual objects can be tagged or associated with metadata that indicates the chemical content (e.g., chemicals present, the amounts or concentrations of the chemicals, etc.) estimated using the models. As another example, the data 580*b* can be provided to one or more user devices 585, such as a smartphone, laptop computer, desktop computer, etc., for presentation to a user in a user interface.

In the example, the predicted chemical content is assessed by the computer system 130 or another device and used to sort the objects in the waste stream. For example, the chemical content can be compared with one or more thresholds that correspond to different bins 515*a*-515*c*, conveyors, or other output streams. The predictions can then be used by the computer system 130 or another system to control sorting equipment, such as the sorting machine 510, that is configured to move objects to different areas or containers. Different categories of objects (e.g., groups having different chemical properties) can be processed differently for mechanical or chemical recycling. In some implementations, the properties of the waste stream overall can be assessed and accumulated to determine the overall mix of plastics and other compounds along the conveyor 505. Even if the items are not sorted, the information about the nature of the waste stream can be used to adjust parameters of chemical recycling of the waste stream, such as to adjust the concentration of different inputs, solvents, or catalysts used, or to adjust other recycling parameters. As another example, a user can be presented an alert if the chemical content is above a maximum level, below a minimum level, inside a range, outside a range, or satisfies another predetermined condition.

Figures 6A, 6B:
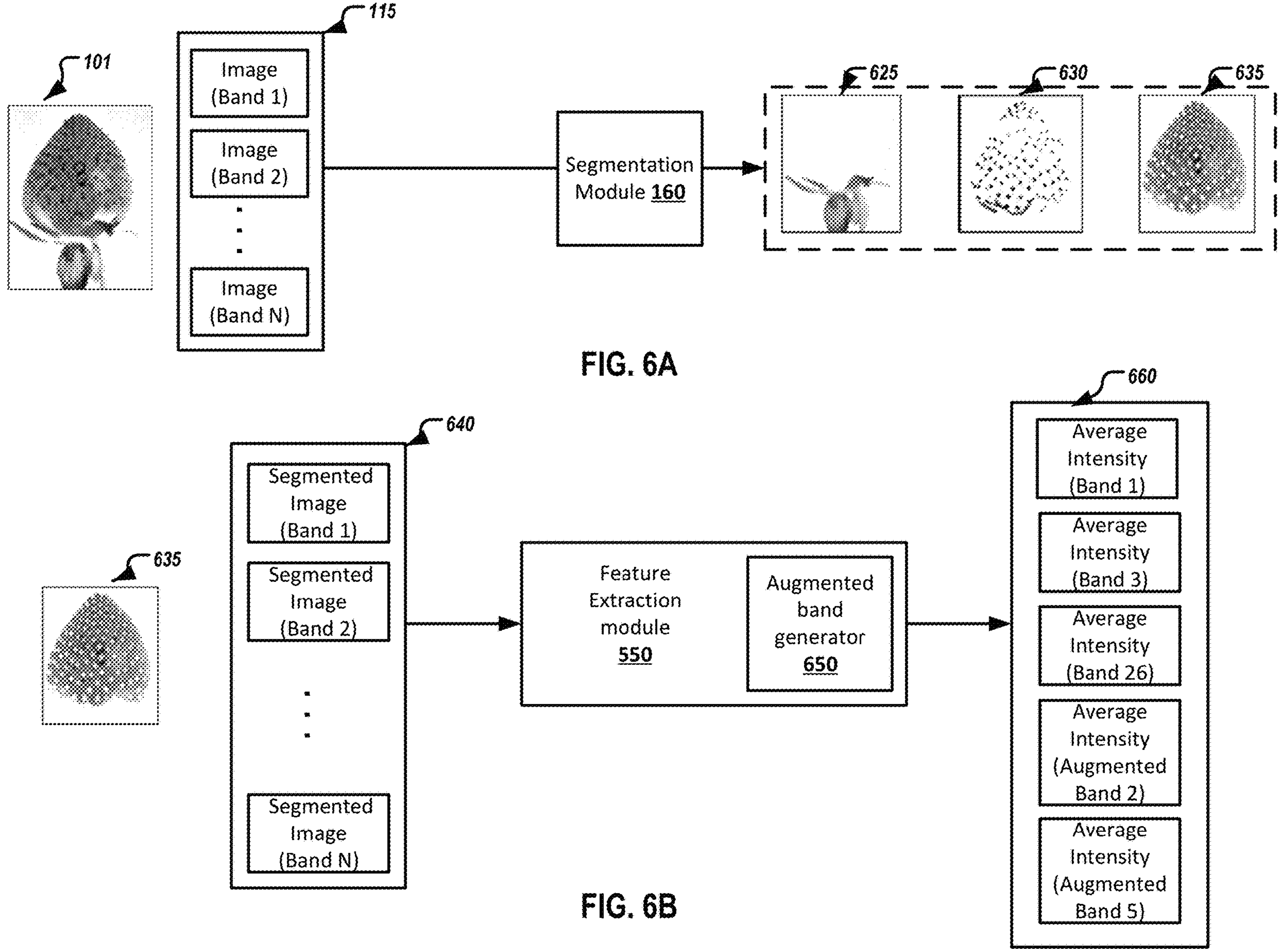
FIG. 6A is a block diagram illustrating image segmentation of a hyperspectral image of a particular type of fruit.
FIG. 6B is a block diagram illustrating the generation of a set of feature values from a segmented image, to obtain a feature vector to provide as input to a machine learning model.

FIG. 6A is an example block diagram illustrating image segmentation of a hyperspectral image that can be performed by the feature extraction module 550. The segmentation can be tuned for a particular type of object, such as a particular type of fruit (e.g., strawberries) that the machine learning model 170 is trained to make predictions about. The image segmentation can identify the boundaries of a sample (e.g., a fruit) in a hyperspectral image 115, and may also identify specific types of regions of the sample (e.g., leaves, seeds, flesh, etc.)

A segmentation module 160 receives as input the hyperspectral image 115 of the object 101. The segmentation module 160 processes the input and generates, as output, data that identifies the boundaries of different regions of the image. The segmentation module 160 processes the hyperspectral image 115 to generate image segments 625, 630, and 635, where image segment 625 represents the leaves and/or stem of the strawberry, image segment 630 represents the seeds on the exterior surface of the strawberry, and image segment 635 represents the exterior flesh of the strawberry. Of these, only the segment 635 is indicative of the sugar content of the strawberry, and so only the segment 635 is used to generate feature values for input to the machine learning model 170.

FIG. 6B is an example block diagram illustrating generation of a set of feature values 660 for input to the machine learning model 170. This can include generation of augmented bands from the multiple spectral bands of the image 115. Rather than use the entire image 115, the system uses the region identified as segment 635, while disregarding the pixels in the rest of the image 115. After segmentation, the segment 635 includes values for the same spectral bands as the original hyperspectral image 115, but only the pixels in certain spatial regions are considered.

The feature extraction module 150 can include an augmented band generator 650 that processes image data for different spectral bands to generate augmented bands of image data. These augmented bands can be based on combinations of image data from different bands, with any of various operations applied, such as addition, subtraction, multiplication, division, etc. of the per-pixel intensity values for one band with the corresponding per-pixel intensity values of another band. In some cases the augmented bands can include different non-linear combinations of the input bands, such as calculating the intensity values for band 1, dividing by the intensity values for band 2, and then outputting the quotient squared (e.g., $(\text{band 1}/\text{band 2})^2$).

The feature extraction module generates an input vector 660 for the machine learning model 170. For example, the augmented band generator 650 takes as input the segmented hyperspectral image 640 and generates an input vector 660 that comprises average intensity values for segmented images for each band in a predetermined set of bands, e.g., bands 1, 3, 26 and augmented bands 2 and 5. This set of bands can be a subset of the total number of available bands, where the subset has been determined through previous analysis to be the set that is most appropriate for or at least minimally relevant to the prediction of the properties that the model 170 is created to predict. In some implementations, other properties in addition to or instead of average intensity values can be generated and provided as input to the machine learning model 170. For example, values indicating maximum intensity, minimum intensity, median intensity, characteristics of intensity distribution, and so on may be provided as features, in addition to or instead of an arithmetic mean of the intensity values in a segmented portion of the image data for a spectral band. As other examples, a feature may indicate whether a peak, trough, zero-crossing or baseline-crossing was detected at a given frequency band (e.g., in a spectrum, preprocessed spectrum, derivative of a spectrum, derivative of a preprocessed spectrum, second derivative of a spectrum, second derivative of a preprocessed spectrum, etc.); an integral of a convolution of a kernel and a spectrum (or a kernel and a derivative or second derivative a spectrum); a number of peaks; etc.

Figure 7:
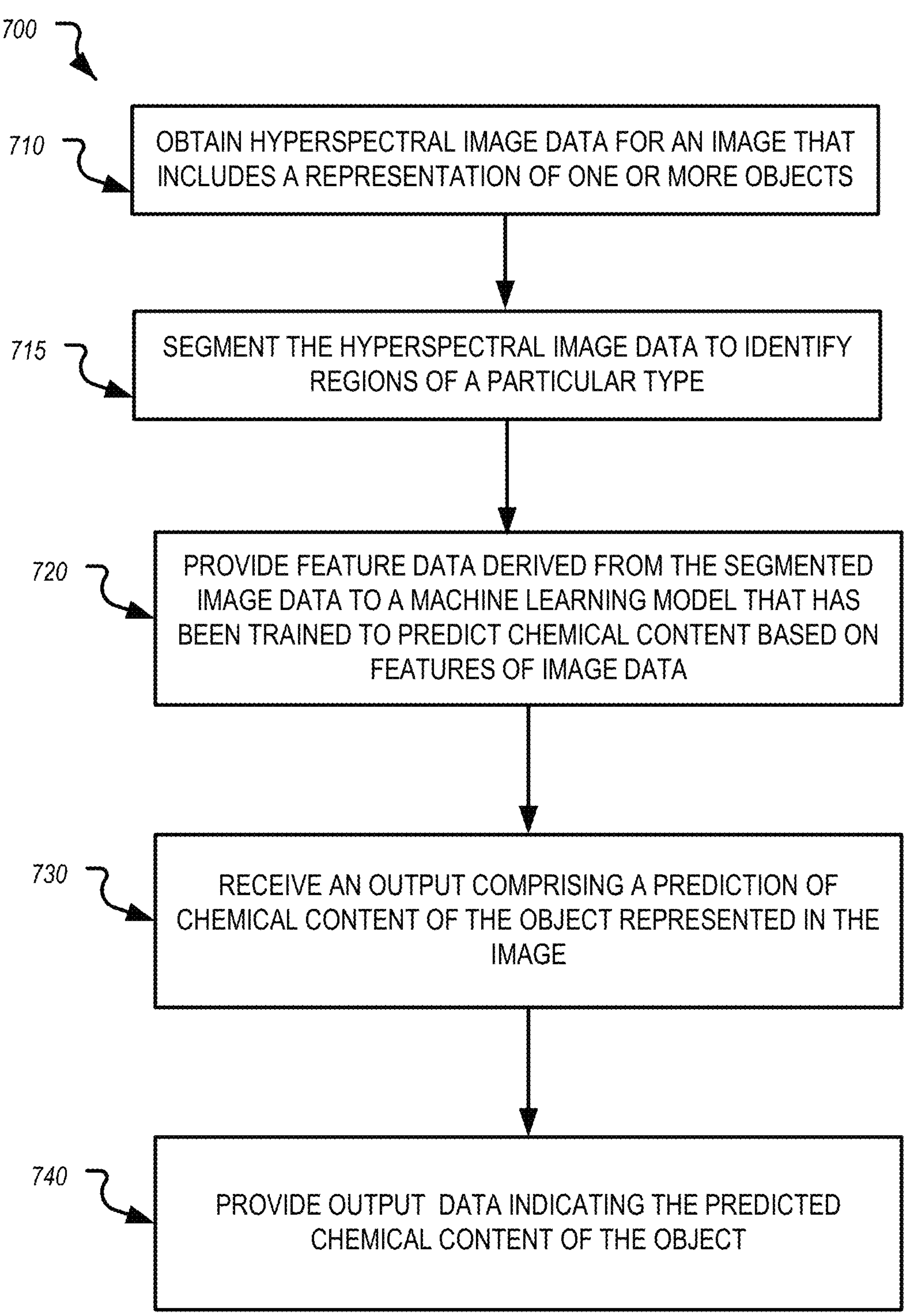
FIG. 7 is a flow diagram describing a process of performing chemical analysis using image segmentation and machine learning.

FIG. 7 is a flow diagram illustrating an example of a process 700 for analyzing chemical composition of a particular type of fruit. Operations of the process 700 can be performed by one or more data processing apparatus or computing devices, such as computer system 130 discussed above. Operations of the process 700 can also be implemented as instructions stored on a computer readable medium. Execution of the instructions can cause one or more data processing apparatus, or computing devices, to perform operations of the process 700. Operations of the process 700 can also be implemented by a system that includes one or more data processing apparatus, or computing devices, and a memory device that stores instructions that cause the one or more data processing apparatus or computing devices to perform operations of the process 700.

Before the process 700, the machine learning model 170 can be trained. For example, the model can be trained using a set of training images that comprises a plurality of images of a type of object to be analyzed, e.g., strawberries. Each image in the set of training images can have a corresponding ground truth value for each of the chemical properties to be predicted, e.g., sugar content of the fruit depicted in the image. In some implementations, an image of the fruit used for training is captured first to show the unaltered exterior of the object. The ground truth chemical property values are subsequently obtained by performing an invasive and/or destructive chemical test, such as to cut or crush a fruit to determine the sugar content of the fruit.

The set of training images 540 may further include parameters other than the ground truth sugar content of the fruit strawberry. For example, each example in the set of training images may include an image, a ground truth chemical property (e.g., concentration, amount, or other level of a chemical or group of chemicals), an identifier for the type of object, context data about the location or source of the object, an angle at which the particular image was taken, the position of the camera within the scene, and the specification of the camera system that was used to capture the particular image. Any or all of these values may be used to provide features as input to the machine learning model in training and in inference processing.

The process 700 obtains image data for an image that includes a representation of a particular piece of fruit (710). For example, a hyperspectral image can be captured for an object about which a prediction regarding chemical content is desired.

The process 700 includes segmenting the hyperspectral image data to identify regions of a particular type on the object (715). For example, the outer surface of a strawberry generally comprises both the flesh and the achenes. The system processes the hyperspectral image to perform image segmentation and so separate the image regions showing the flesh part of the fruit from the achenes.

The process 700 provides feature data derived from the image data to a machine learning model that has been trained to predict a level of chemical content based on hyperspectral image data (720). For example, the computer system 130 uses the feature extraction module 550 to determine feature values that represent characteristics of the identified regions of the particular type. For example, the feature values can describe the image data for different wavelength bands in the regions identified as corresponding to the particular type of region. For example, the particular type of region can be the flesh portion of the strawberry's exterior, with the achenes and calyx of the strawberry excluded, and with the background for the image excluded also. The feature values can be aggregated values for different bands, such as an average value for the intensity of different bands. One example type of feature value is the mean intensity value taken over all the pixels for one wavelength band that are located in the regions identified as corresponding to the flesh of the strawberry. The aggregate value for a band can be, for example, a mean, median, mode, geometric mean, proportion of pixels that fall in a certain range of values, etc. The set of feature values are then processed by the machine learning model to determine an output indicative of the level of chemical content to be predicted.

In addition to feature values for single wavelength bands, the system can also obtain feature values for synthetic or composite bands. For example, the system can combine certain predetermined bands using predetermined functions to create a combination that the system identifies as predictive of chemical properties of interest. From the composite image, the system can then derive one or more feature values, such as a mean pixel intensity, across the set of pixels located in the regions identified as corresponding to the flesh of the strawberry.

The process 700 includes receiving an output comprising a prediction of a level of chemical content of the object represented in the image (730). For example, the extracted features that represent the exterior portion of a strawberry are provided as input to the trained machine learning model 170. The machine learning model 170 processes the input features based on the trained parameters and generates a value which is the predicted sugar content 170 of the strawberry that is depicted in the image 115.

The process 700 includes providing output data indicating the predicted level of chemical content of the object (740). For example, the prediction can be provided to a user device for presentation, or to a sorting or packaging machine to control handling of the object. Similarly, the predicted value or a classification of the object may be stored in a database in association with an object identifier or an identifier for a group of objects that includes the object.

Example

Figure 8A:
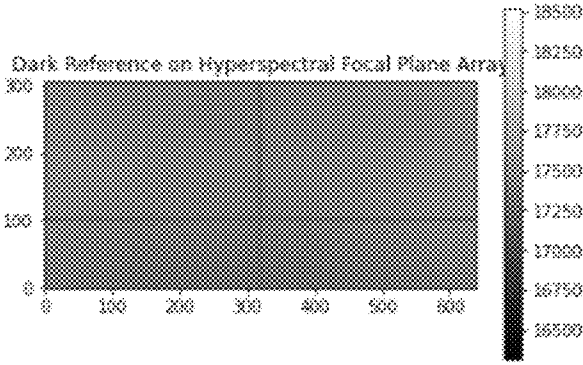
FIGS. 8A-8C show exemplary hyperspectral data for a dark reference hyperspectral image.
Figure 8B:
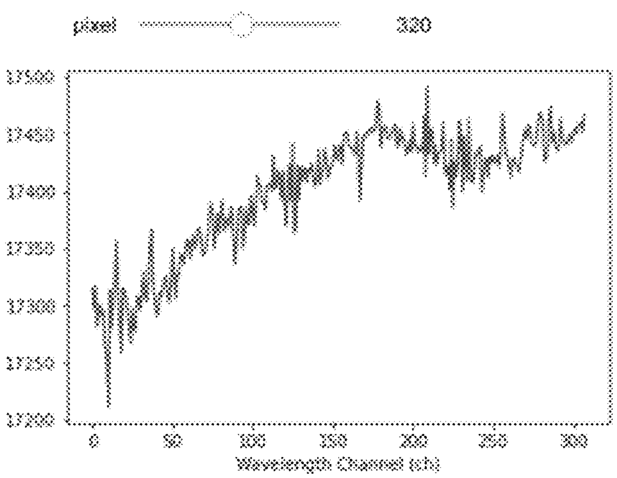
Figure 8C:
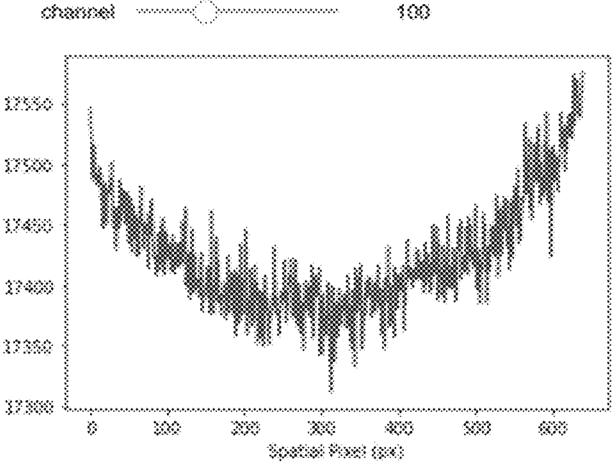
Figure 9A:
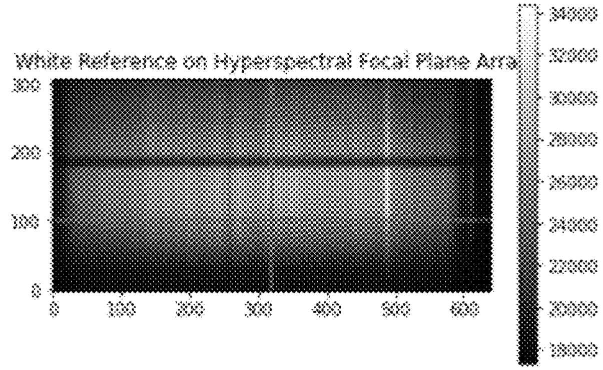
FIGS. 9A-9C show corresponding exemplary hyperspectral data for a light reference hyperspectral image.
Figure 9B:
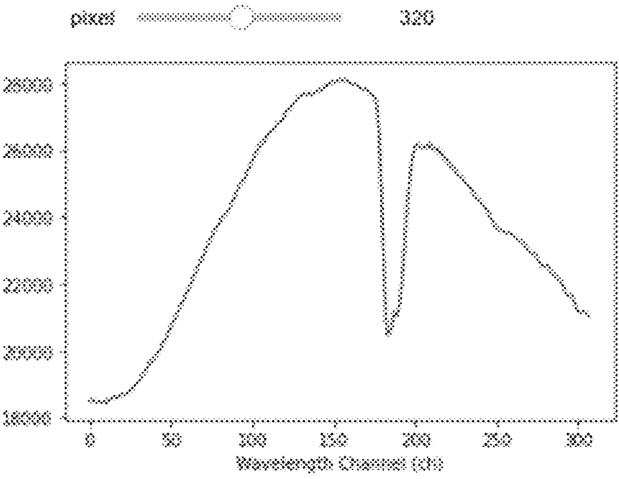
Figure 9C:
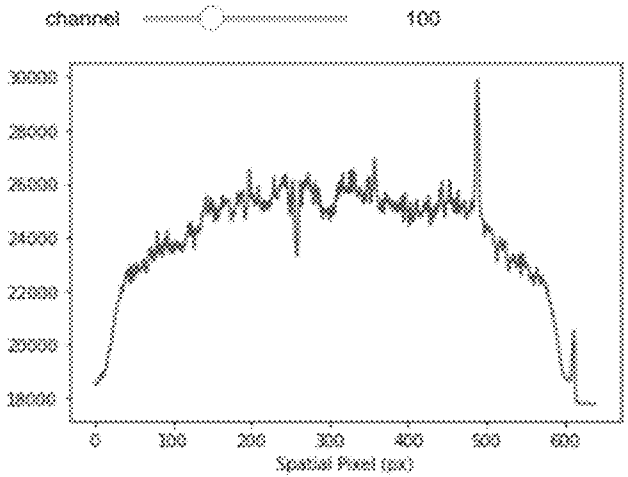

An imaging system is configured to capture line-scan hyperspectral images of objects moving along a conveyor built. Two reference hyperspectral images are collected—each without any objects on the conveyor built. One ("light") reference hyperspectral image is collected with each light source of the imaging system on at full brightness illuminating an object with a spectrally flat and spatially homogeneous reflectance, and one ("dark") reference hyperspectral image is collected with each light source of the imaging system blocked from illuminating the cameras. FIGS. 8A-8C show exemplary hyperspectral data for a dark reference hyperspectral image. FIG. 8A shows a color map, where the color identifies the intensity, the x-axis (columns) spans positions, and the y-axis (rows) frequency bands. FIG. 8B shows a slice of the color map across frequencies, and FIG. 8C shows a slice of the color map across positions. FIGS. 9A-9C show corresponding exemplary hyperspectral data for a light reference hyperspectral image. The dip in the intensities shown in FIG. 9B is attributable to ambient $CO_2$. The reference hyperspectral images may be collected repeatedly (e.g., every day, every week, every month, every six months, etc.), as the intensities attributable to the light source and/or ambient light may change in time.

Figure 10:
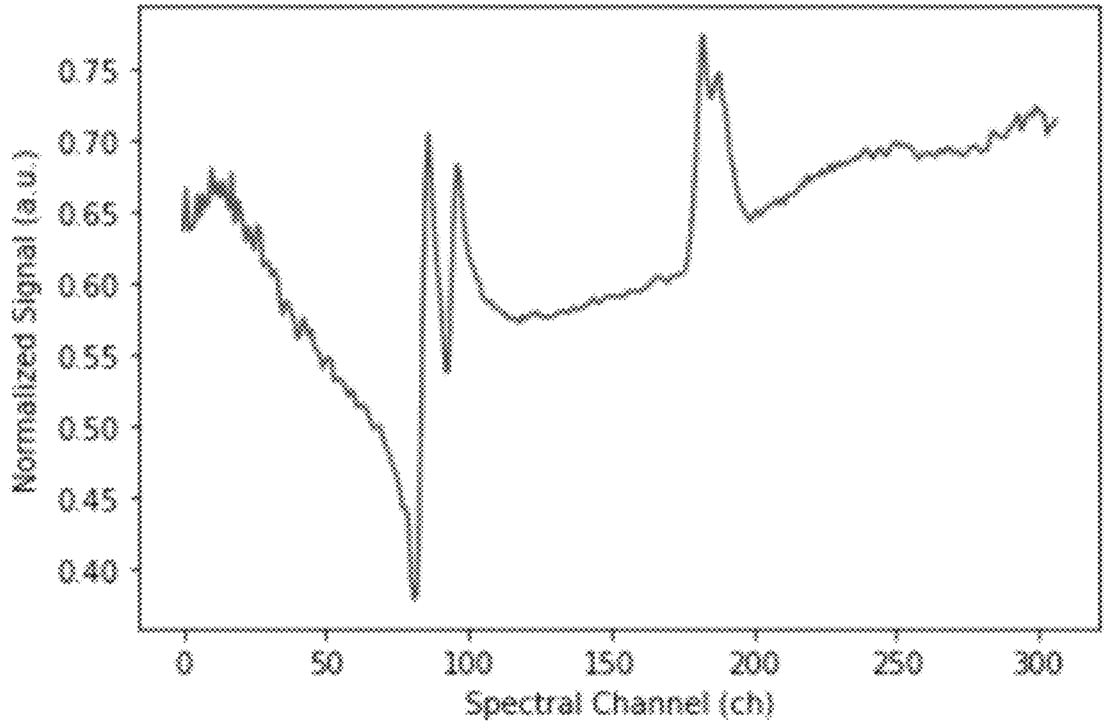
FIG. 10 shows an example of a spectrum of a polyethylene plastic.

A spectrum of each of one or more chemicals (e.g., pure plastics) is also collected. FIG. 10 shows an example of a normalized and pre-processed of a polyethylene plastic observed with a hyperspectral camera. The bands between channel 75-125 correspond to the influence of the C—H molecular absorbances on the observed signal. The bands between 175 and 200 correspond to the loss of light attributable to atmospheric $CO_2$ present during the measurement. While a spectrum is shown here for only one specific exemplary chemical, it will be appreciated that spectra for other chemicals may be collected (e.g., for natural PVC, polyethylene black, polypropylene natural, PVC grey, polypropylene black, and/or polyethylene natural).

Each spectrum (for example) could include 308 frequency bands. Detecting signals that can be used to reliably differentiate and/or detect materials with so many values may be difficult due to inter-band correlations, particularly given that a given object may include multiple chemicals or a single chemical may result in correlated signals across many bands. Accordingly, a feature set is defined that has fewer values than a given spectra. Specifically, 32 kernels are designed by a convolutional neural network machine learning model to reduce the dimensionality for the data input from 308 to 32. The action of convolution of the kernels with the hypercube projects the full set of bands at each pixel to 32 feature maps which can be used to decode spatial information in subsequent processing steps. The 32 kernels are chosen to minimize prediction loss across training and evaluation sets.

Subsequently, a conveyor belt supporting an object begins to move, such that the object moves towards a field of view of the imaging system. The imaging system collects a hyperspectral image by performing a line scan. The hyperspectral image is availed to a computing system, which uses the two reference hyperspectral images to preprocess the hyperspectral image, so as to indicate an extent to which each measured intensity is near a maximum value relative to a minimum value. The preprocessed hyperspectral image is then segmented, such that pixels corresponding to an object are detected.

In a first analysis each, for each pixel corresponding to the object, the preprocessed spectrum is convolved with each of the 32 kernels. The 32 kernels result in 32 feature maps. The feature maps are subsequently fed to a convolutional neural network to process spatial correlations among the pixel features. The output of this second convolutional neural network may consist of chemical composition, more detailed analytical chemical data (such as a predicted absorbance spectrum), or the presence of contaminants.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, various forms of the flows shown above may be used, with steps re-ordered, added, or removed. Also, although several applications of providing incentives for media sharing and methods have been described, it should be recognized that numerous other applications are contemplated. Accordingly, other implementations are within the scope of the following claims.

What is claimed is:

1. A method performed by one or more computers, the method comprising:

obtaining, by the one or more computers, image data that indicates an extent to which one or more objects reflect, scatter, or absorb light at each of multiple wavelength bands, wherein the image data was collected while a conveyor belt was moving the one or more objects;

preprocessing the image data to generate preprocessed image data, wherein the preprocessing includes performing a first analysis across frequencies and/or performing a second analysis across a representation of a spatial dimension, wherein the preprocessing further includes selecting a subset of the multiple wavelength bands and generating one or more synthetic bands by applying one or more operations to combine the image data from two or more selected bands, wherein each synthetic band is different from the subset of the multiple wavelength bands selected during preprocessing;

performing an automatic segmentation based on the preprocessed image data, the segmentation determines different types of regions of the one or more objects;

generating, by the one or more computers, a set of feature values derived from segmented regions of the preprocessed image data;

generating, by the one or more computers and based on an output produced by a machine learning model in response to the set of feature values being provided as input to the machine learning model, a prediction of an identity of a chemical in the one or more objects or a level of one or more chemicals in the one or more objects, wherein the prediction further includes an identity of contaminant or of a particular type of plastic or a level of contaminant or of the particular type of plastic in the one or more objects, wherein the machine learning model is trained using the set of feature values derived from the segmented regions of the preprocessed image data to classify the one or more objects as recyclable based on the particular type of plastic and the level of contaminant in the one or more objects; and providing, by the one or more computers, data indicating the prediction of the identity of the chemical in the one or more objects or the level of the one or more chemicals in the one or more objects.

2. The method of claim 1, wherein preprocessing the image data includes:

normalizing hyperspectral data using one or more reference image data sets.

3. The method of claim 1, wherein preprocessing the image data includes:

generating a derivative using the image data;

identifying a threshold; and performing a threshold-crossing analysis using the derivative of the image data and the threshold.

4. The method of claim 1, wherein the image was collected by a camera with:

a lens positioned such that an optical axis of the lens is between 40-50 degrees relative to a surface of the conveyor belt; or an image sensor positioned such that an optical axis of the image sensor is between 40-50 degrees relative to a surface of the conveyor belt.

5. The method of claim 1, wherein the image was collected by a camera with:

a lens positioned such that an optical axis of the lens is between 85-95 degrees relative to a surface of the conveyor belt; or an image sensor positioned such that an optical axis of the image sensor is between 85-95 degrees relative to a surface of the conveyor belt.

6. The method of claim 1, wherein the image was collected by a camera with:

a lens positioned such that an optical axis of the lens is less than 15 degrees relative to a surface of the conveyor belt; or an image sensor positioned such that an optical axis of the image sensor is less than 15 degrees relative to a surface of the conveyor belt.

7. The method of claim 1, wherein:

the image data includes, for each position of a set of positions along a dimension of the conveyor belt and for each frequency of a set of frequencies, a value identifying a reflectance, absorption, or absorbance corresponding to the position and frequency;

the method further comprises identifying a subset of the set of positions as corresponding to a particular object using a segmentation technique; and generating the set of feature values comprises generating the set of feature values derived from a portion of the image data corresponding to the subset of the set of positions.

8. The method of claim 1, wherein generating the set of feature values comprises:

accessing a set of kernels; and convolving each of one or more parts of the preprocessed image data using each of the set of kernels.

9. The method of claim 8, wherein each of at least one of the set of kernels includes a frequency signature corresponding to a particular set of chemicals.

10. The method of claim 1, wherein the image data includes hyperspectral image data.

11. The method of claim 1, comprising sorting plastic objects from a waste stream based on the predicted identity of the chemical in at least one of the plastic objects or based on the predicted level of the one or more chemicals in at least one of the plastic objects.

12. The method of claim 1, wherein the machine learning model is a decision tree or a neural network.

13. The method of claim 1, wherein the preprocessing the image data is performed in a same computational workflow as the machine learning.

14. The method of claim 1, wherein the prediction is of an identity of a major component in an object of the one or more objects.

15. A system comprising:

one or more processors; and one or more computer-readable media storing instructions that are operable, when executed by the one or more processors, to cause the system to perform operations comprising:

obtaining, by the one or more processors, image data that indicates an extent to which one or more objects reflect, scatter, or absorb light at each of multiple wavelength bands, wherein the image data was collected while a conveyor belt was moving the one or more objects;

preprocessing the image data to generate preprocessed image data, wherein the preprocessing includes performing a first analysis across frequencies and/or performing a second analysis across a representation of a spatial dimension, wherein the preprocessing further includes selecting a subset of the multiple wavelength bands and generating one or more synthetic bands by applying one or more operations to combine the image data from two or more selected bands, wherein each synthetic band is different from the subset of the multiple wavelength bands selected during preprocessing;

performing an automatic segmentation based on the preprocessed image data, the segmentation determines different types of regions of the one or more objects;

generating, by the one or more computers, a set of feature values derived from segmented regions of the preprocessed image data;

generating, by the one or more processors and based on an output produced by a machine learning model in response to the set of feature values being provided as input to the machine learning model, a prediction of an identity of a chemical in the one or more objects or a level of one or more chemicals in the one or more objects, wherein the prediction further includes an identity of contaminant or of a particular type of plastic or a level of contaminant or of the particular type of plastic in the one or more objects, wherein the machine learning model is trained using the set of feature values derived from the segmented regions of the preprocessed image data to classify the one or more objects as recyclable based on the particular type of plastic and the level of contaminant in the one or more objects; and providing, by the one or more processors, data indicating the prediction of the identity of the chemical in the one or more objects or the level of the one or more chemicals in the one or more objects.

16. The system of claim 15, wherein preprocessing the image data includes:

normalizing hyperspectral data using one or more reference image data sets.

17. The system of claim 15, wherein preprocessing the image data includes:

generating a derivative using the image data;

identifying a threshold; and performing a threshold-crossing analysis using the derivative of the image data and the threshold.

18. The system of claim 15, wherein the image was collected by a camera with:

a lens positioned such that an optical axis of the lens is between 40-50 degrees relative to a surface of the conveyor belt; or an image sensor positioned such that an optical axis of the image sensor is between 40-50 degrees relative to a surface of the conveyor belt.

19. The system of claim 15, wherein the image was collected by a camera with:

a lens positioned such that an optical axis of the lens is between 85-95 degrees relative to a surface of the conveyor belt; or an image sensor positioned such that an optical axis of the image sensor is between 85-95 degrees relative to a surface of the conveyor belt.

20. One or more non-transitory computer-readable media storing instructions that are operable, when executed by the one or more computers, to cause the system to perform operations comprising:

obtaining, by the one or more computers, image data that indicates an extent to which one or more objects reflect, scatter, or absorb light at each of multiple wavelength bands, wherein the image data was collected while a conveyor belt was moving the one or more objects;

preprocessing the image data to generate preprocessed image data, wherein the preprocessing includes performing a first analysis across frequencies and/or performing a second analysis across a representation of a spatial dimension, wherein the preprocessing further includes selecting a subset of the multiple wavelength bands and generating one or more synthetic bands by applying one or more operations to combine the image data from two or more selected bands, wherein each synthetic band is different from the subset of the multiple wavelength bands selected during preprocessing;

performing an automatic segmentation based on the preprocessed image data, the segmentation determines different types of regions of the one or more objects;

generating, by the one or more computers, a set of feature values derived from segmented regions of the preprocessed image data;

generating, by the one or more computers and based on an output produced by a machine learning model in response to the set of feature values being provided as input to the machine learning model, a prediction of an identity of a chemical in the one or more objects or a level of one or more chemicals in the one or more objects, wherein the prediction further includes an identity of contaminant or of a particular type of plastic or a level of contaminant or of the particular type of plastic in the one or more objects, wherein the machine learning model is trained using the set of feature values derived from the segmented regions of the preprocessed image data to classify the one or more objects as recyclable based on the particular type of plastic and the level of contaminant in the one or more objects; and providing, by the one or more computers, data indicating the prediction of the identity of the chemical in the one or more objects or the level of the one or more chemicals in the one or more objects.

* * * * *